(12) United States Patent
Song et al.

(10) Patent No.: US 9,987,922 B2
(45) Date of Patent: Jun. 5, 2018

(54) CAPLESS REFUELING MECHANISM

(71) Applicant: Ford Global Technologies, LLC, Dearborn, MI (US)

(72) Inventors: Xiankai Song, Farmington Hills, MI (US); Michael Terrence Zitkovic, Jr., Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/238,255

(22) Filed: Aug. 16, 2016

(65) Prior Publication Data
US 2018/0050586 A1 Feb. 22, 2018

(51) Int. Cl.
*B65D 49/08* (2006.01)
*B60K 15/04* (2006.01)
*B65D 49/02* (2006.01)

(52) U.S. Cl.
CPC .. *B60K 15/0406* (2013.01); *B60K 2015/0429* (2013.01)

(58) Field of Classification Search
CPC ............ B60K 15/04; B60K 2015/0429; B60K 2015/0461; B60K 15/0483; B60K 15/0406
USPC .............................................. 220/86.2, 86.1
See application file for complete search history.

(56) References Cited

U.S. PATENT DOCUMENTS

| 6,415,827 | B1 | 7/2002 | Harris et al. | |
|---|---|---|---|---|
| 6,539,990 | B1 | 4/2003 | Levey et al. | |
| 6,968,874 | B1 * | 11/2005 | Gabbey | B60K 15/04 141/348 |
| 7,302,977 | B2 | 12/2007 | King et al. | |
| 7,621,303 | B2 * | 11/2009 | Buchgraber | B60K 15/04 141/348 |
| 7,665,493 | B2 | 2/2010 | Groom et al. | |
| 7,789,113 | B2 | 9/2010 | Stephan et al. | |
| 8,281,825 | B2 | 10/2012 | Yoshida | |
| 8,539,993 | B2 | 9/2013 | Hagano | |
| 8,567,458 | B2 * | 10/2013 | Sato | B60K 15/04 141/350 |
| 8,714,214 | B2 * | 5/2014 | Cisternino | B60K 15/04 141/348 |
| 9,102,228 | B2 | 8/2015 | Sasaki | |
| 2007/0034287 | A1 * | 2/2007 | Groom | B60K 15/04 141/350 |
| 2010/0295332 | A1 | 11/2010 | Benjey | |
| 2011/0079322 | A1 | 4/2011 | Beier et al. | |
| 2011/0132906 | A1 * | 6/2011 | Miller | B60K 15/04 220/86.2 |
| 2012/0312420 | A1 | 12/2012 | Kataoka et al. | |
| 2013/0327768 | A1 | 12/2013 | Kataoka et al. | |

(Continued)

*Primary Examiner* — J. Gregory Pickett
*Assistant Examiner* — Niki M Eloshway
(74) *Attorney, Agent, or Firm* — Julia Voutyras; McCoy Russell LLP

(57) ABSTRACT

A capless refueling mechanism attached to a vehicle fuel tank is disclosed. In one example, the capless refueling mechanism includes a guide plate, main opening, misfueling inhibitor mechanism with a first and second pendulum arm mounted within the main opening, and a sealing door pivotably coupled to the refueling mechanism. The first and second pendulum arm of the misfueling inhibitor may be adjusted to move from a first position to a second position, allowing a fuel nozzle sized to fit the main opening to open the sealing door and dispense fuel into the fuel tank.

19 Claims, 17 Drawing Sheets

(56) References Cited

U.S. PATENT DOCUMENTS

| | | | | |
|---|---|---|---|---|
| 2014/0284329 A1* | 9/2014 | Frank | ............... | B60K 15/03006 |
| | | | | 220/86.2 |
| 2014/0352846 A1* | 12/2014 | Ryu | ....................... | B60K 15/04 |
| | | | | 141/350 |
| 2016/0185212 A1* | 6/2016 | Kito | ....................... | B60K 15/04 |
| | | | | 220/86.2 |

\* cited by examiner

CAPLESS REFUELING MECHANISM

FIELD

The present description relates generally to methods and systems for a refueling mechanism attached to an onboard vehicle fuel tank for supplying fuel to an internal combustion engine.

BACKGROUND/SUMMARY

A vehicle including an internal combustion engine commonly includes a fuel tank for supplying fuel to the engine. The fuel tank may be filled with fuel by an operator of the vehicle via a fuel passage extending between the fuel tank and an exterior fuel opening of the vehicle. In one example, the fuel opening may be positioned on a side panel of a vehicle body and may be accessed by unlatching a door positioned in front (relative to the vehicle body) of the fuel opening. A refueling mechanism may be mounted inside the fuel opening to provide an interface between the fuel passage and a fuel nozzle coupled to an external fuel source. The refueling mechanism may include an external aperture configured to receive and couple the fuel nozzle to the fuel passage. The refueling mechanism may also be threaded along a circumference of the refueling mechanism in order to secure a protective cap over the external aperture.

Issues may arise when the protective cap is detached from the refueling mechanism (during refueling of the fuel tank) and not reattached properly after refueling and upon removal of the fuel nozzle. Furthermore, the external aperture and a sealing door (to seal off the fuel tank from the external aperture) may not provide a means for guiding the fuel nozzle into the fueling mechanism during refueling. As a consequence, it may be difficult to adequately position the fuel nozzle upon insertion into the refueling mechanism, and may result in an incomplete filling of the fuel tank. Additionally, occurrences of misfueling which may occur when the vehicle operator refills the fuel tank with an incorrect type of fuel may cause further issues.

Attempts to address inconsistent fuel nozzle positioning and other issues described above include utilizing a capless refueling mechanism. One example approach is shown by Levey in U.S. Pat. No. 6,539,990. Therein, a closure mechanism is provided at a distal end of a fuel passage of a fuel port. The closure mechanism has a component that opens and closes as a fuel nozzle is inserted or removed from the fuel port. Another example approach is shown by Groom in U.S. Pat. No. 7,665,493. Therein, a capless refueling mechanism includes a nozzle inhibitor to prevent a vehicle operator from filling unleaded fuel into a diesel fuel tank. Yet another example capless refueling port is shown by Kataoka in U.S. Patent 2013-0327768. Therein, the capless fueling port includes a sealing door to guide the fuel nozzle into a fuel passage of the fuel port.

However, the inventors herein have recognized potential issues with such refueling systems. As one example, the capless refueling device disclosed in Levey does not distinguish between fuel nozzles of different diameters, and may lead to misfueling. For example, a gasoline fuel nozzle with a first diameter and a diesel fuel nozzle with a second diameter may both fit into the capless refueling device, posing potential for misfueling. In another example, the capless refueling port disclosed in Groom includes hooks that attach to gasoline fuel nozzles when inserted into a diesel refueling port. These hooks may occupy more room (within the capless refueling port) when utilized for large diameter fuel nozzles, such as a high flow rate diesel fuel nozzle. Further, a large sealing door disclosed in the capless refueling port in Kataoka may occupy more space within the fuel port, and may therefore create difficulty when inserting the fuel nozzle into the fuel port. In other capless refueling devices, a separate adapter may be needed for inserting fuel nozzles with different diameters (such as low flow and high flow diesel nozzles with a wide range of diameters) into the fuel device, thereby creating additional time and difficulty for the user.

The inventors herein have developed a capless fueling mechanism to address some of issues noted above. In one example, a capless refueling mechanism, may comprise: a body including an opening adapted to receive a fuel nozzle; a door pivotably coupled to the body and adapted to cover the opening; a pair of arms, each rotatably coupled to the body about an arm axis arranged parallel to a central axis of the body and each including a first mating structure adapted to mate with the door. For example, the body of the capless refueling mechanism may comprise a fuel port with a filler pipe coupled to a ramped opening element. The fuel port may be connected to a fuel passage leading to the fuel tank. In this way, the capless fueling mechanism may be used when refueling the fuel tank with low and high flow rate fuel nozzles while reducing fuel vapor emissions to the atmosphere.

For example, a pair of pendulum arms mounted in an external opening of the capless fueling mechanism may be moved to an open position upon insertion of a fuel nozzle with a suitable diameter into the fuel port; the fuel nozzle guided by a sealing door which opens allowing the nozzle to dispense fuel into the fuel tank. In one example, suitable diameter nozzles may be nozzles with low and high flow rates, with diameters in the range of 23.6-37.0 mm. Further, the sealing door may be adjusted to close after refueling and upon removal of the fuel nozzle. By moving the pendulum arms to the open position upon insertion of the suitable diameter fuel nozzle into the fuel port, the vehicle tank may be refilled at low and high flow rates while minimizing mis-fueling due to fuel nozzles with diameters outside the suitable range of nozzle diameters. Further, the sealing door may be used to guide the fuel nozzle into the fuel port, minimizing nozzle slippage during refueling. By closing the sealing door after refueling and upon removal of the fuel nozzle, the fuel tank may be sealed off from the external opening, reducing or minimizing fuel vapor emissions to the atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-17 are shown to scale, although other relative dimensions may be used, if desired.

DETAILED DESCRIPTION

Figure 1:
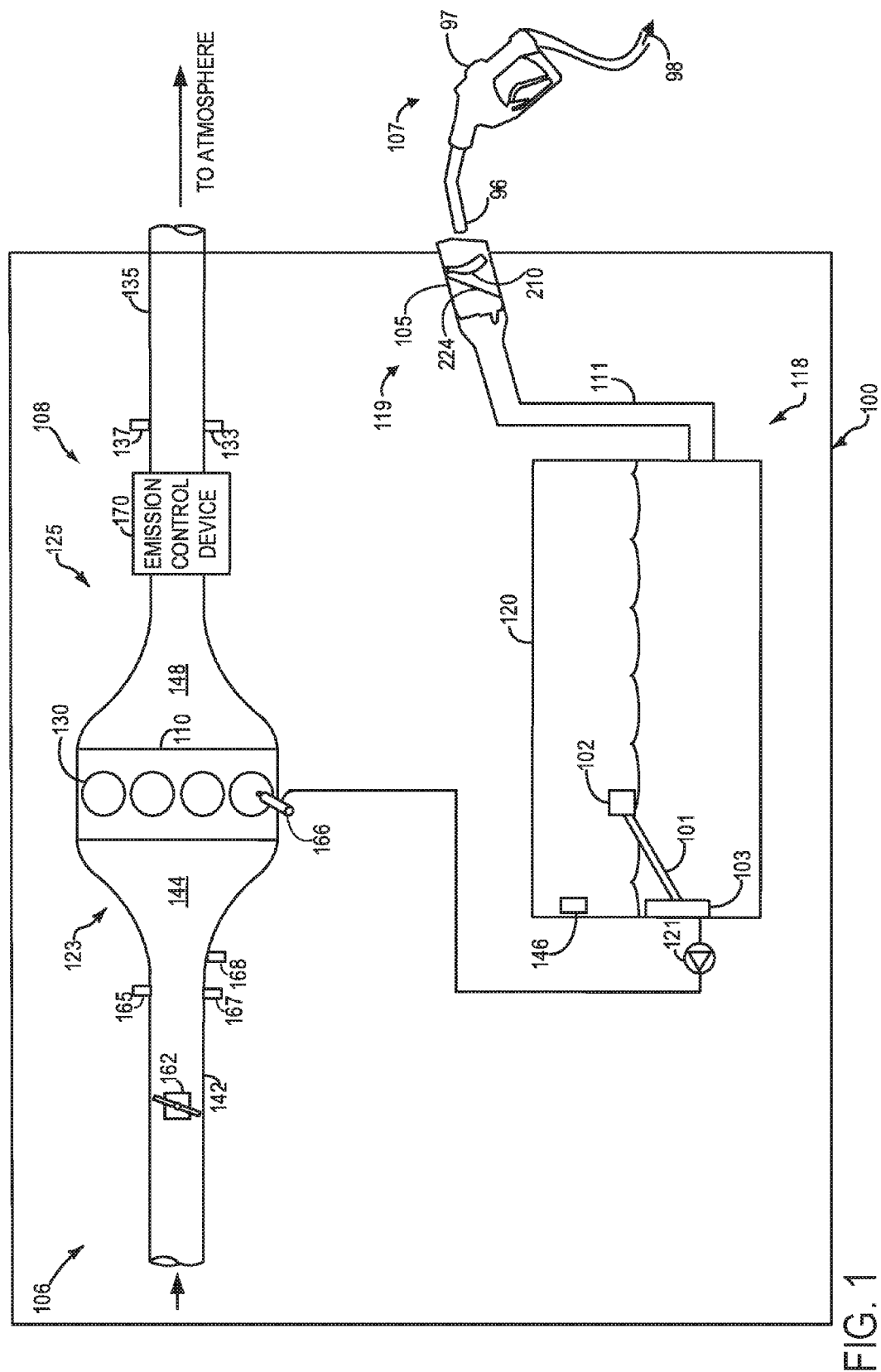
FIG. 1 shows a schematic depiction of a vehicle system including an internal combustion engine and a capless refueling mechanism coupled to a fuel tank.
Figure 2:
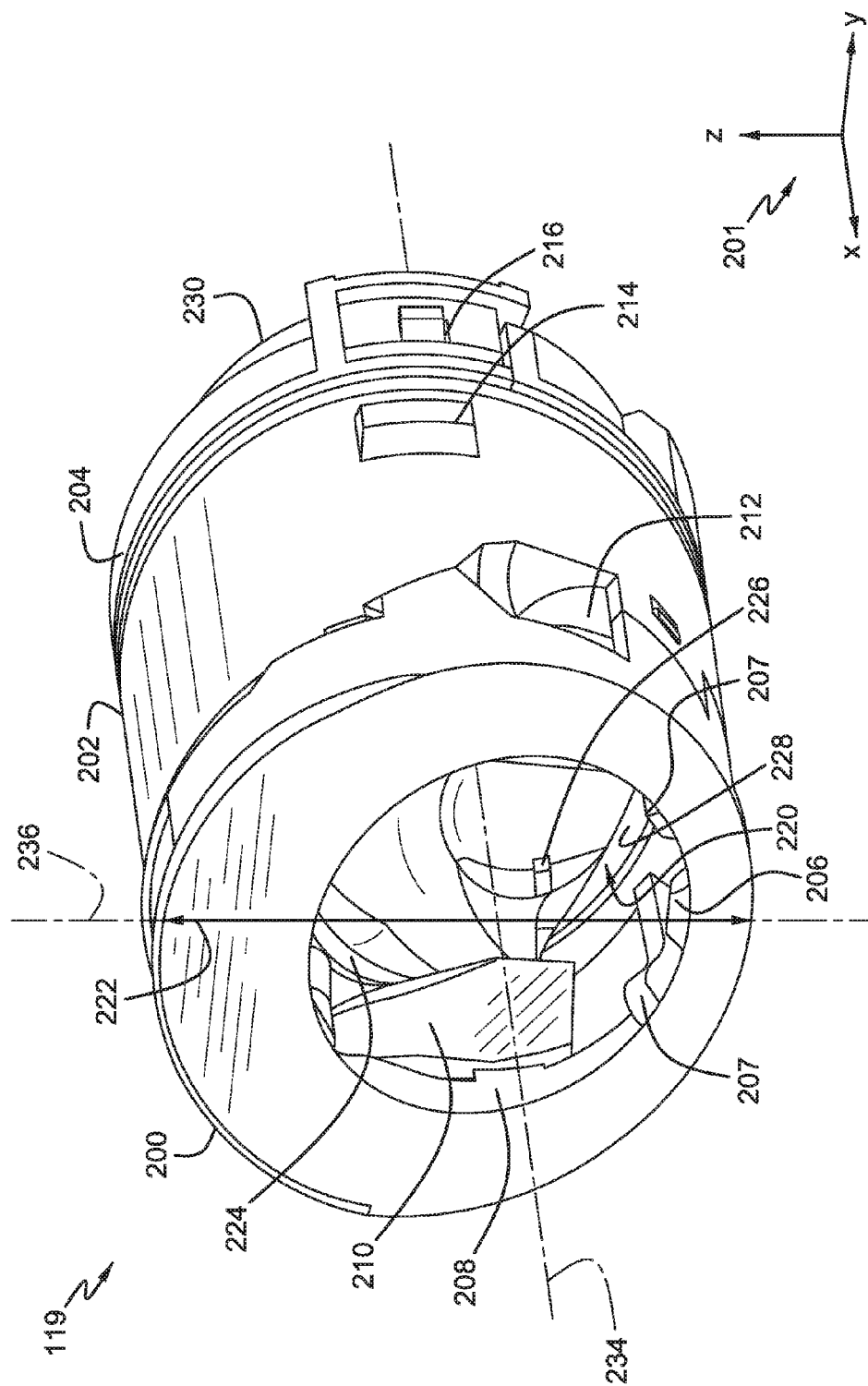
FIG. 2 shows an isometric view of an embodiment of a capless refueling mechanism depicting an adjustable pendulum arm and a sealing door mounted within an external opening of the fuel mechanism.
Figure 3:
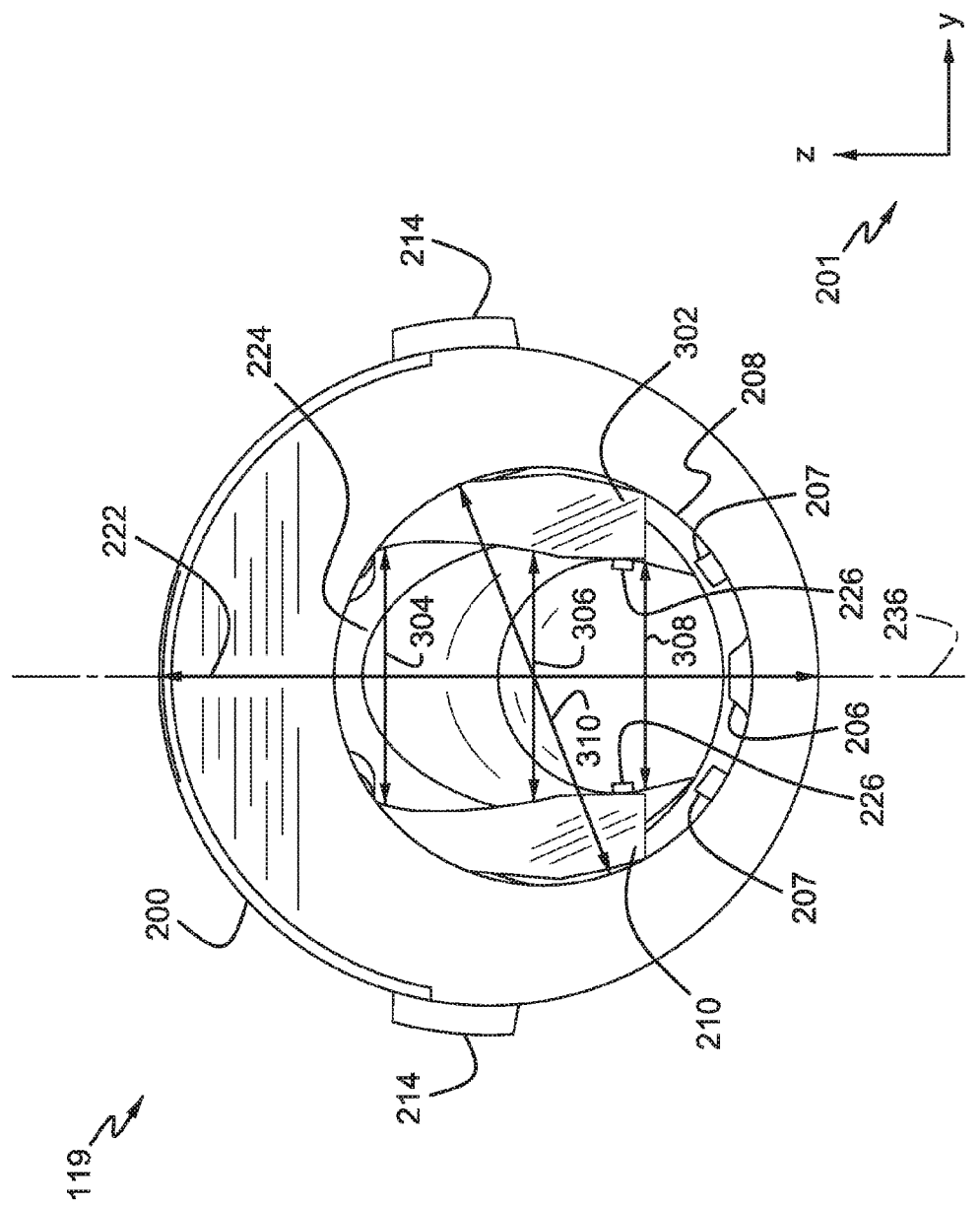
FIG. 3 shows a front view of the capless refueling mechanism depicting a pair of the adjustable pendulum arms and the sealing door.
Figure 4:
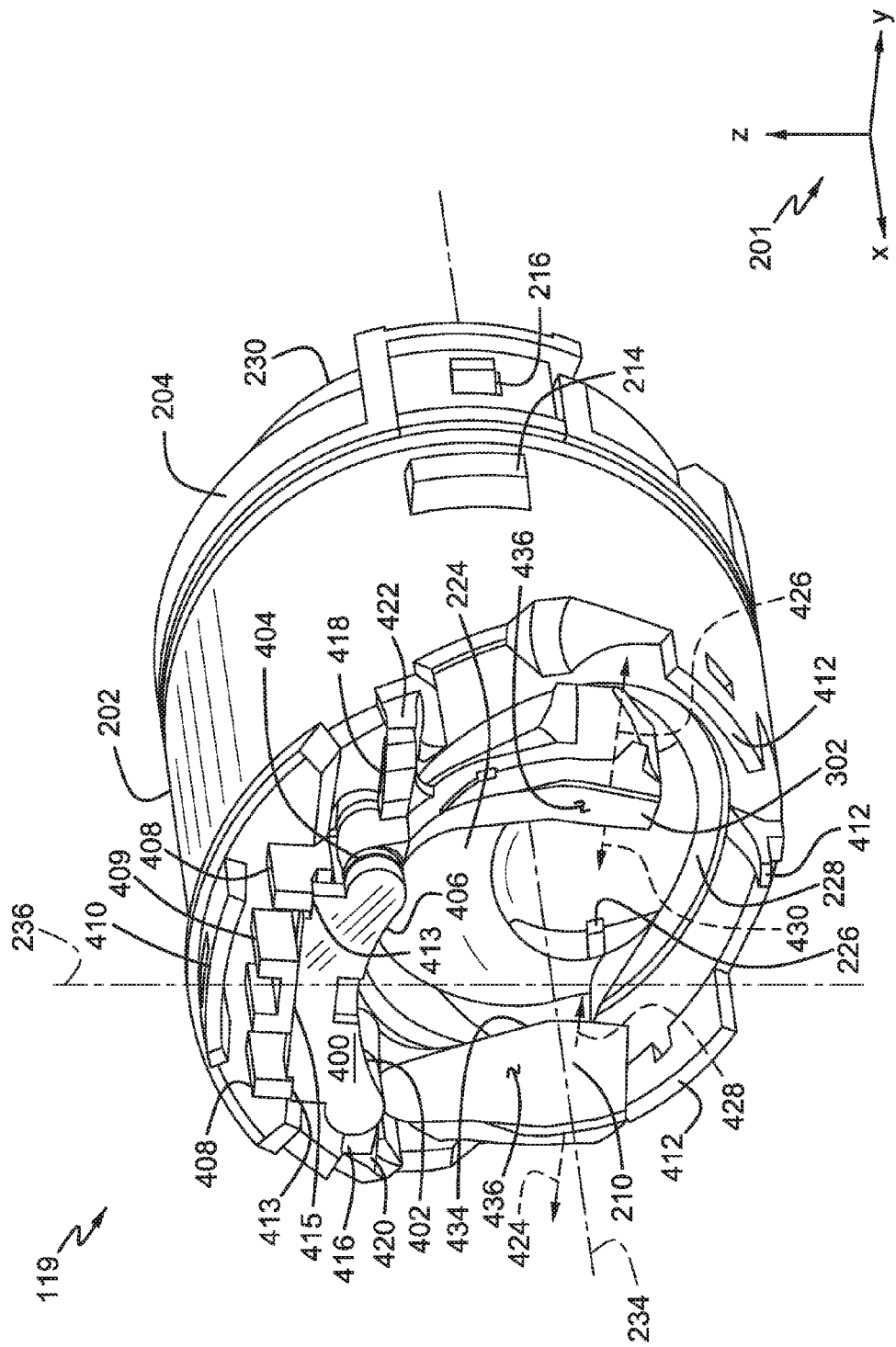
FIG. 4 shows the embodiment of the capless refueling mechanism from a first perspective view with a guide plate of the mechanism removed.
Figure 5:
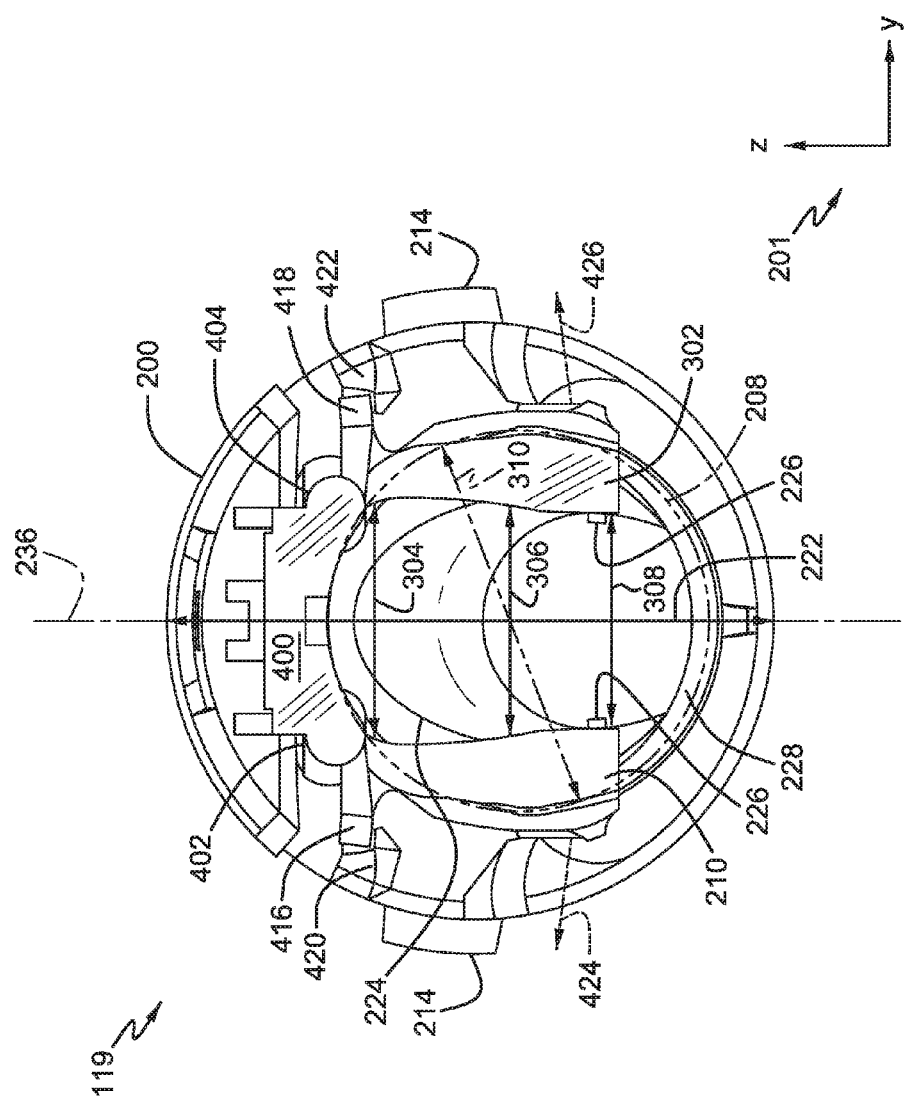
FIG. 5 shows a front view of the capless refueling mechanism with the guide plate of the mechanism removed.
Figure 6:
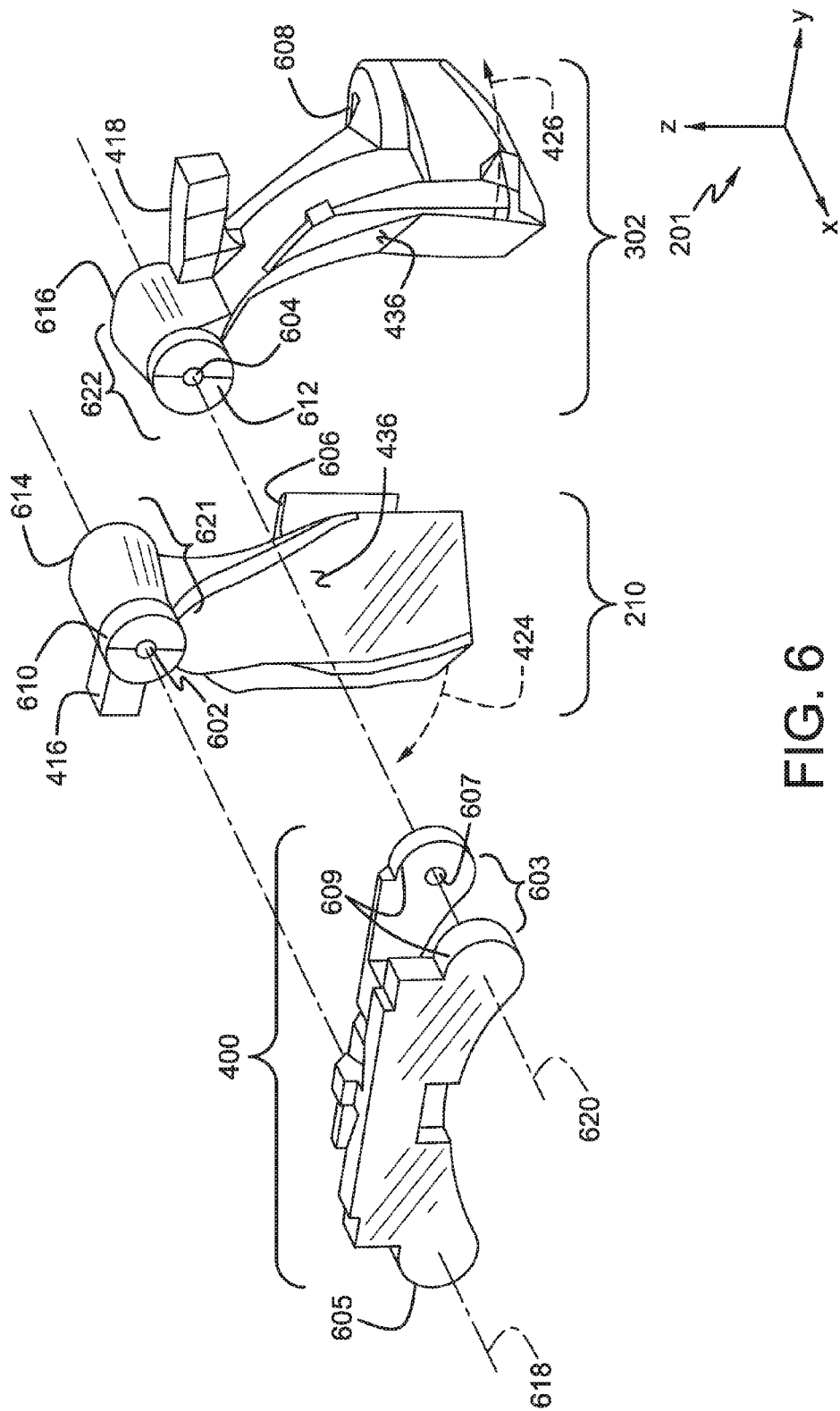
FIG. 6 shows a first embodiment of a misfueling inhibitor included in the embodiment of the capless refueling mechanism in the first perspective view.
Figure 7:
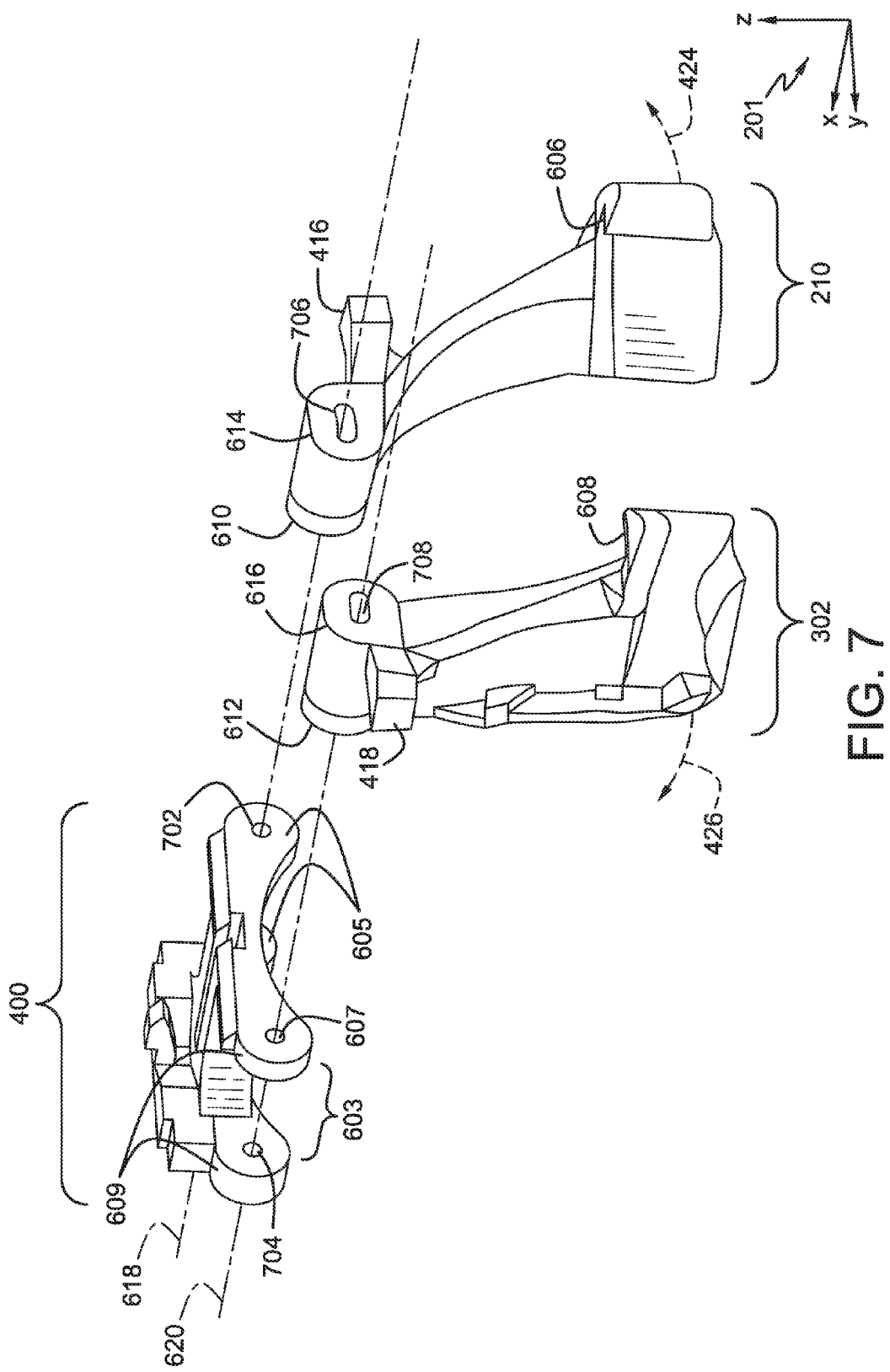
FIG. 7 shows the first embodiment of the misfueling inhibitor from a second perspective view.
Figure 8:
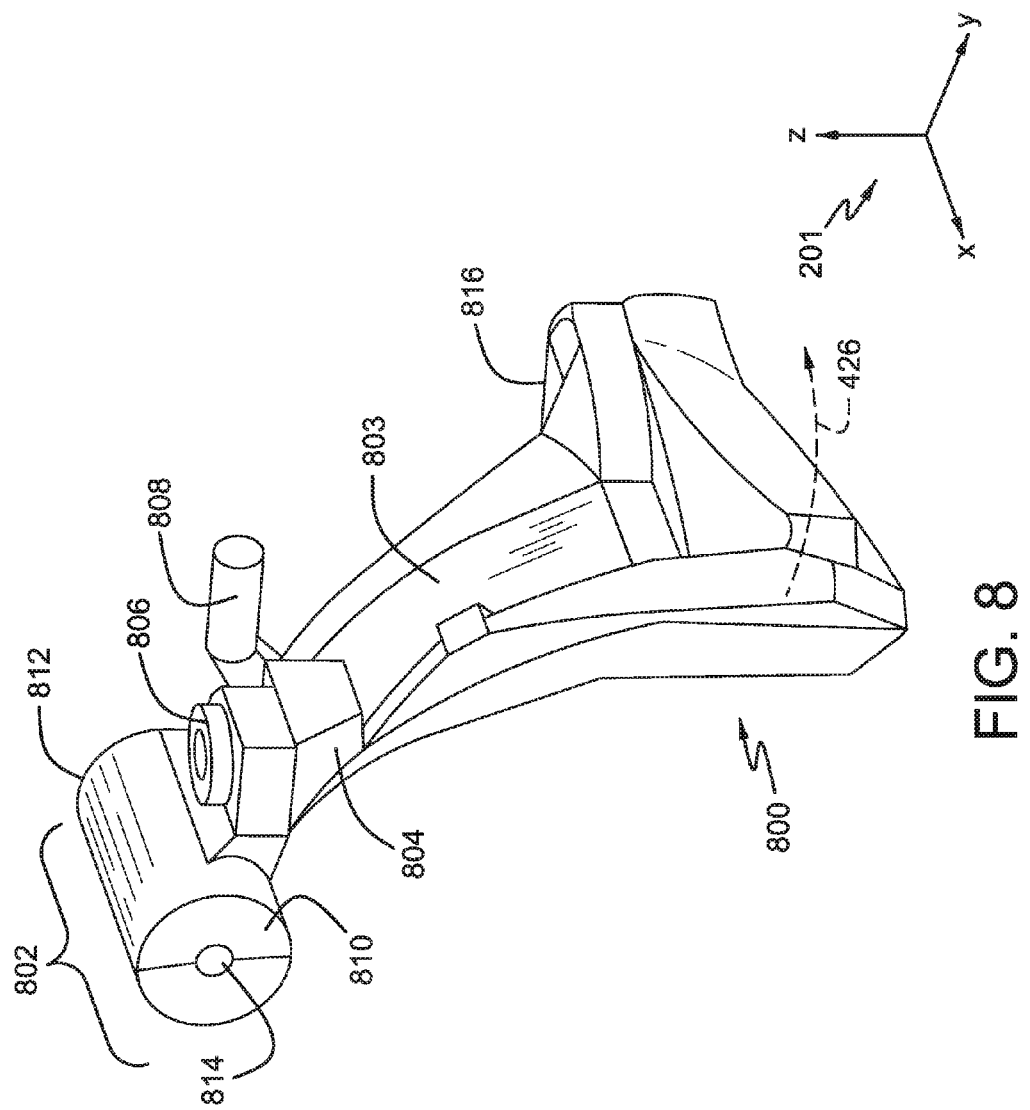
FIG. 8 shows the second embodiment of the misfueling inhibitor from a first perspective view.
Figure 9:
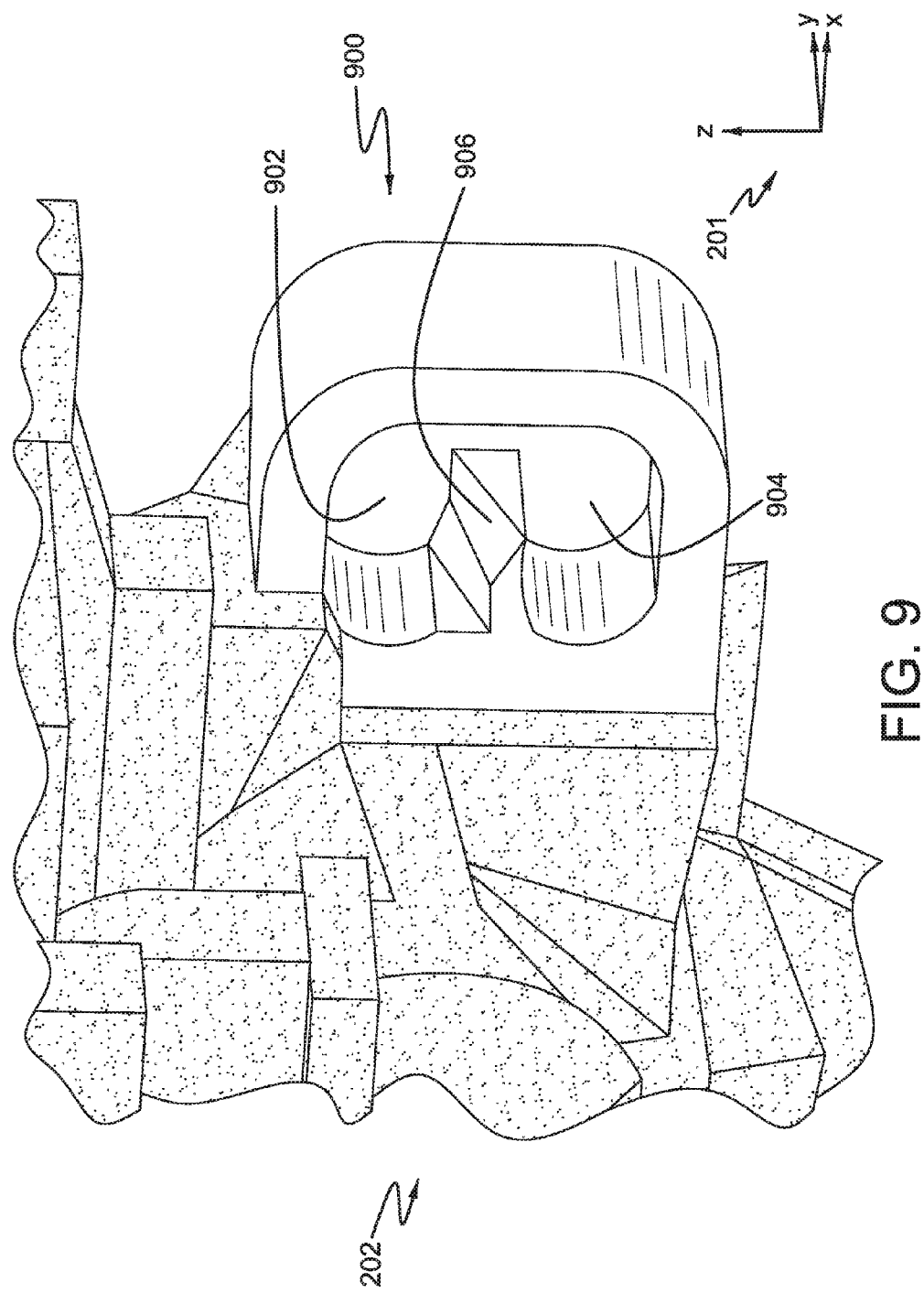
FIG. 9 shows a guide slot for receiving the second embodiment of the misfueling inhibitor from a first perspective view.
Figure 10:
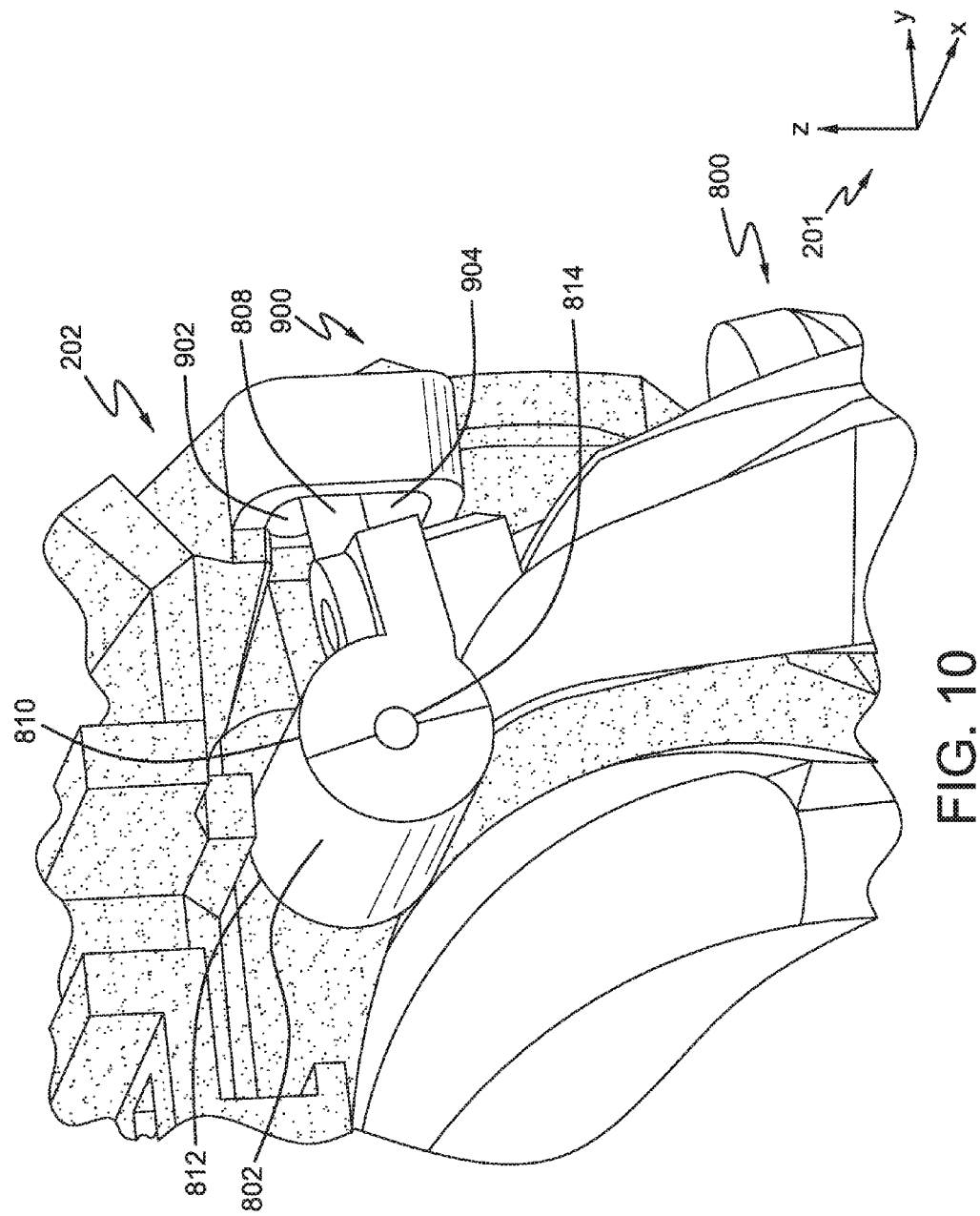
FIG. 10 shows the second embodiment of the misfueling inhibitor included in the embodiment of the capless refueling mechanism from the first perspective view.
Figure 11:
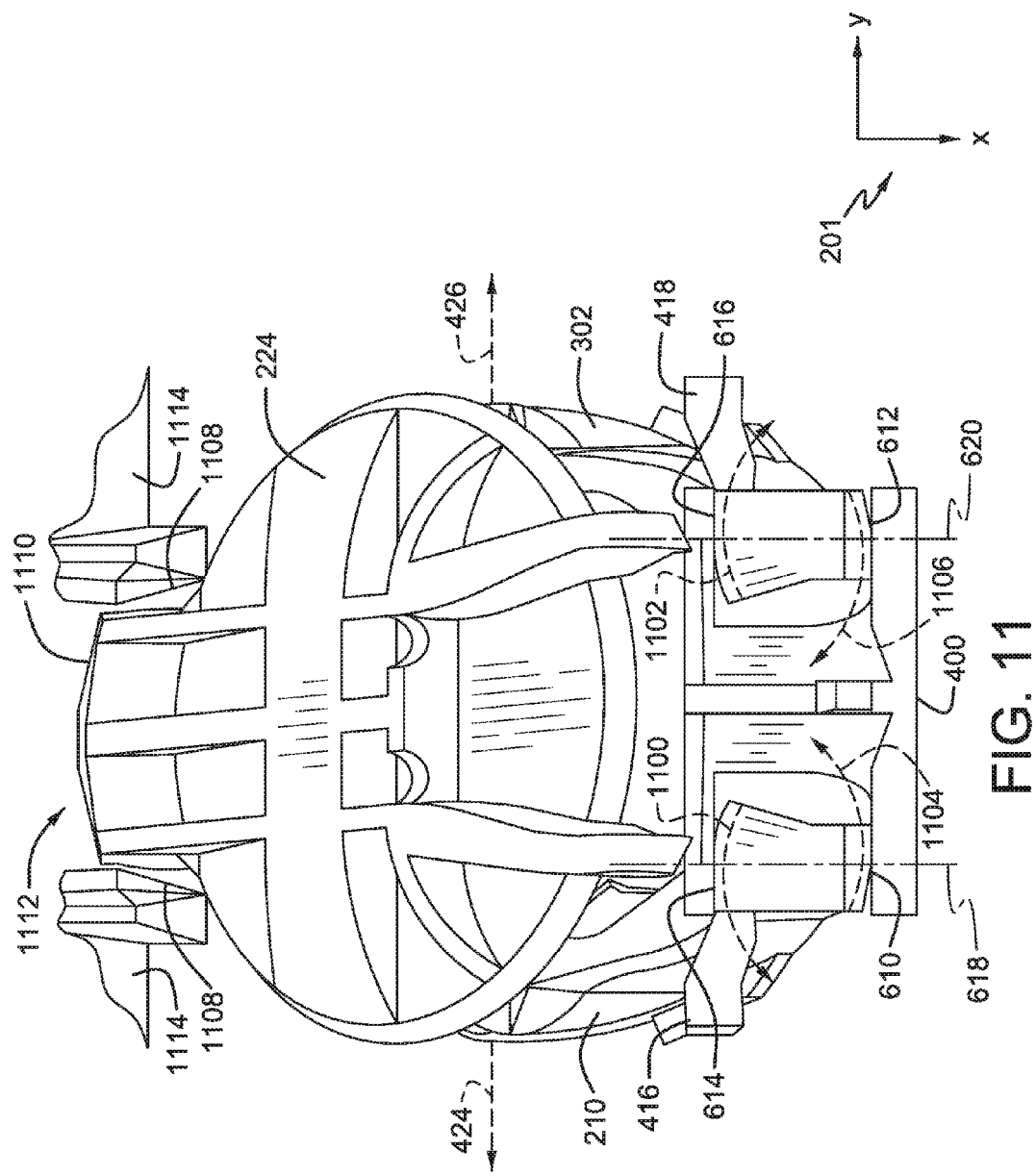
FIG. 11 shows the first embodiment of the misfueling inhibitor mounted in front of a sealing door from a third perspective view, with adjustable pendulum arms coupled to a pivot mounting block.
Figure 12:
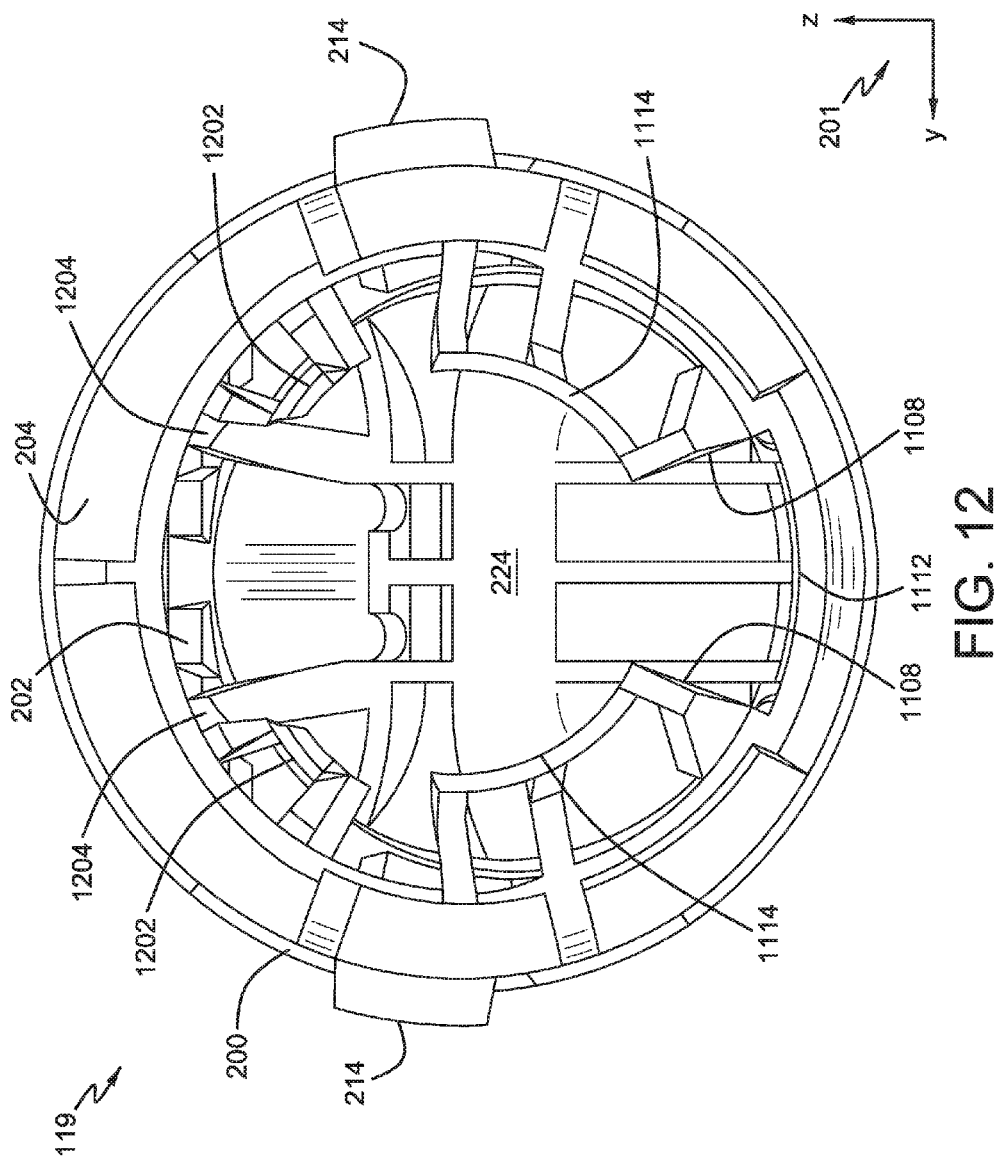
FIG. 12 shows the embodiment of the capless refueling mechanism from a rear view.

The following description relates to a capless refueling port of a vehicle, such as the vehicle shown at FIG. 1. For example, a capless refueling port may be included in a vehicle fueled with diesel, petrol, or a suitable fuel blend such as a gasoline-ethanol fuel blend, etc. FIGS. 2-17 show two-dimensional and three-dimensional schematics of an embodiment of the capless refueling mechanism shown in FIG. 1. Relative sizes and positions of components of the capless refueling mechanism are depicted as shown in FIGS. 2-17. Axis system 201 shown in FIGS. 2-17, include vertical axis z, horizontal axis x, and lateral axis y. As shown at FIG. 2, the capless fuel mechanism may be configured with a guide plate, a pair of pendulum arms (only one viewable in FIG. 2), sealing door, fuel filler pipe and rear opening element attached to the fuel mechanism. A front view of the capless refueling mechanism is depicted with guide plate, a pair of pendulum arms and a sealing door of the fuel mechanism is shown at FIG. 3. FIGS. 4-5 show a partial view of the capless refueling mechanism with the guide plate removed exposing the pair of pendulum arms and sealing door mounted inside a filler pipe of the fuel mechanism. FIGS. 6-7, show an exploded view of a misfueling inhibitor mechanism comprising a first and second pendulum arm, and a pivot mounting block. An alternative embodiment of a pendulum arm of the misfueling inhibitor mechanism is shown at FIG. 8. The alternative embodiment of the pendulum arm allows for rotational and translational motion. FIG. 9 shows a side opening element on the filler pipe for receiving the alternative design of the pendulum arm depicted in FIG. 8. The alternative design of the pendulum arm may be mounted in the side opening element in the filer pipe as shown in FIG. 10. An alternative view showing the misfueling inhibitor mechanism mounted in front of the sealing door, with the first and second pendulum arm attached to the pivot mounting block is shown in FIG. 11. The pivot mounting block allows the first and second adjustable arm to rotate and translate (about a hinge location) when actuated by a fuel nozzle. A rear view of the capless fueling mechanism depicting the sealing door, filler pipe and rear opening element is shown at FIG. 12.

Figure 13:
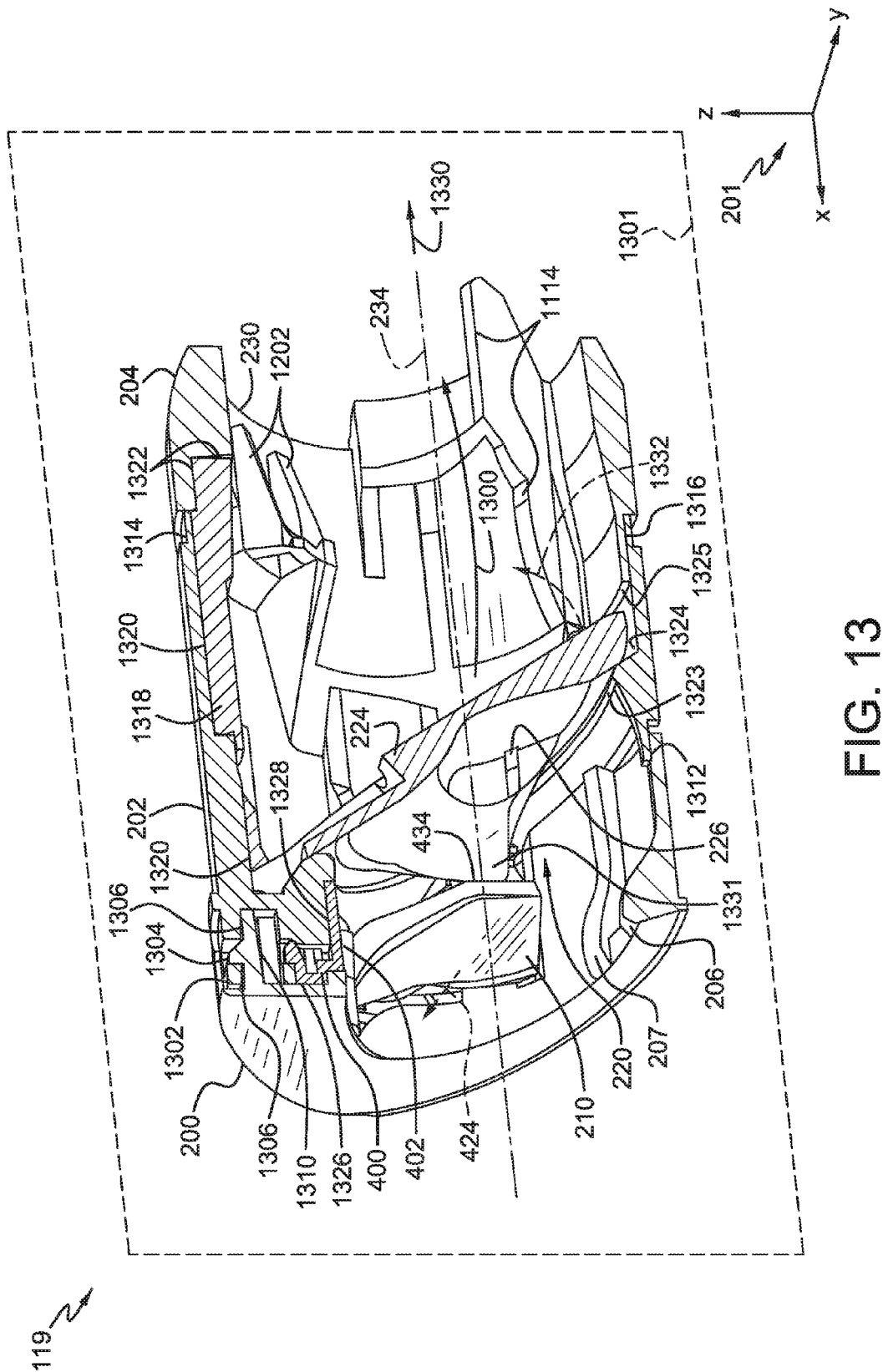
FIG. 13 shows a first cross sectional view along a length of the capless refueling mechanism.
Figure 14:
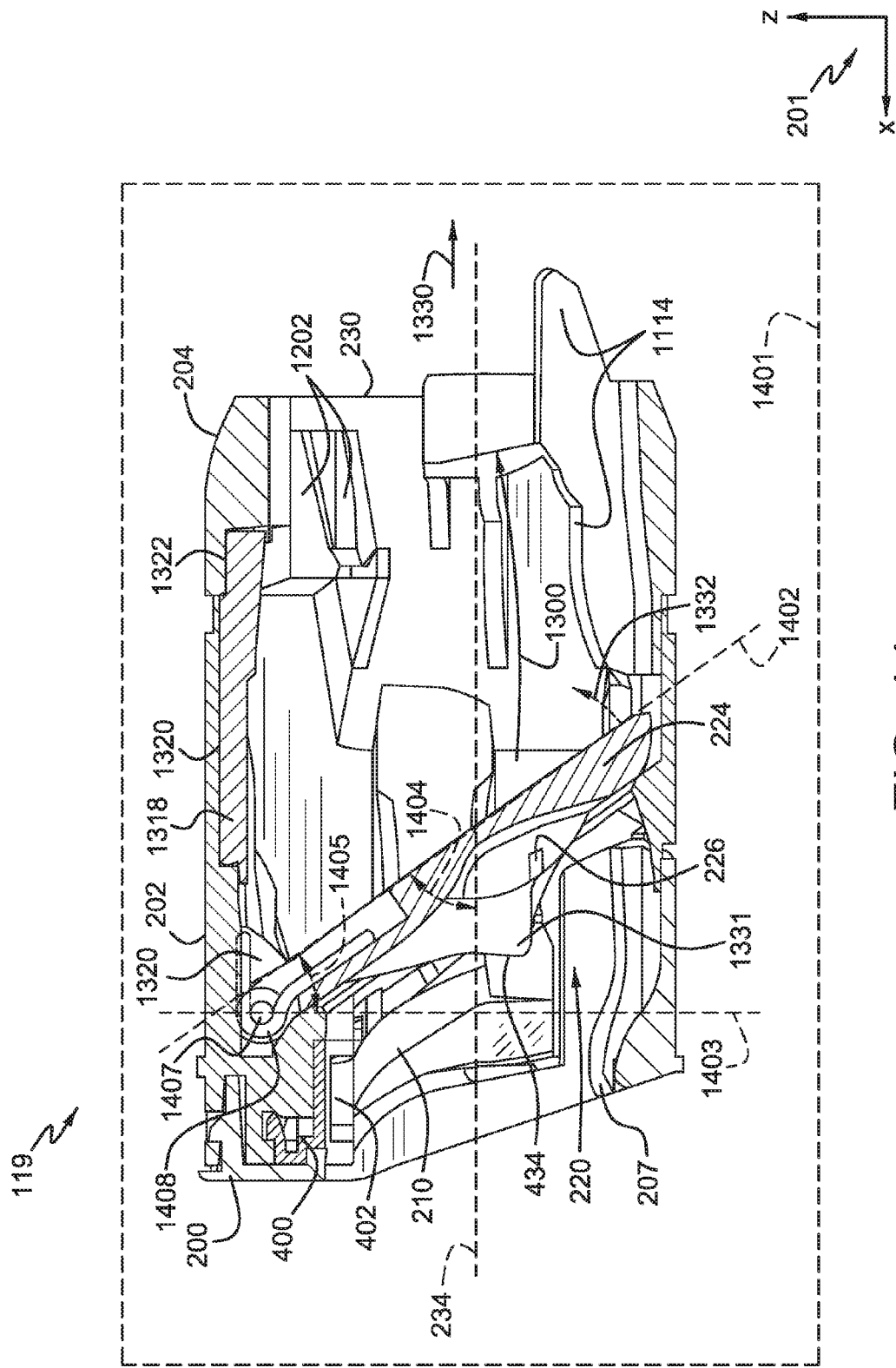
FIG. 14 shows a second cross sectional view along the length of the capless refueling mechanism.
Figure 15:
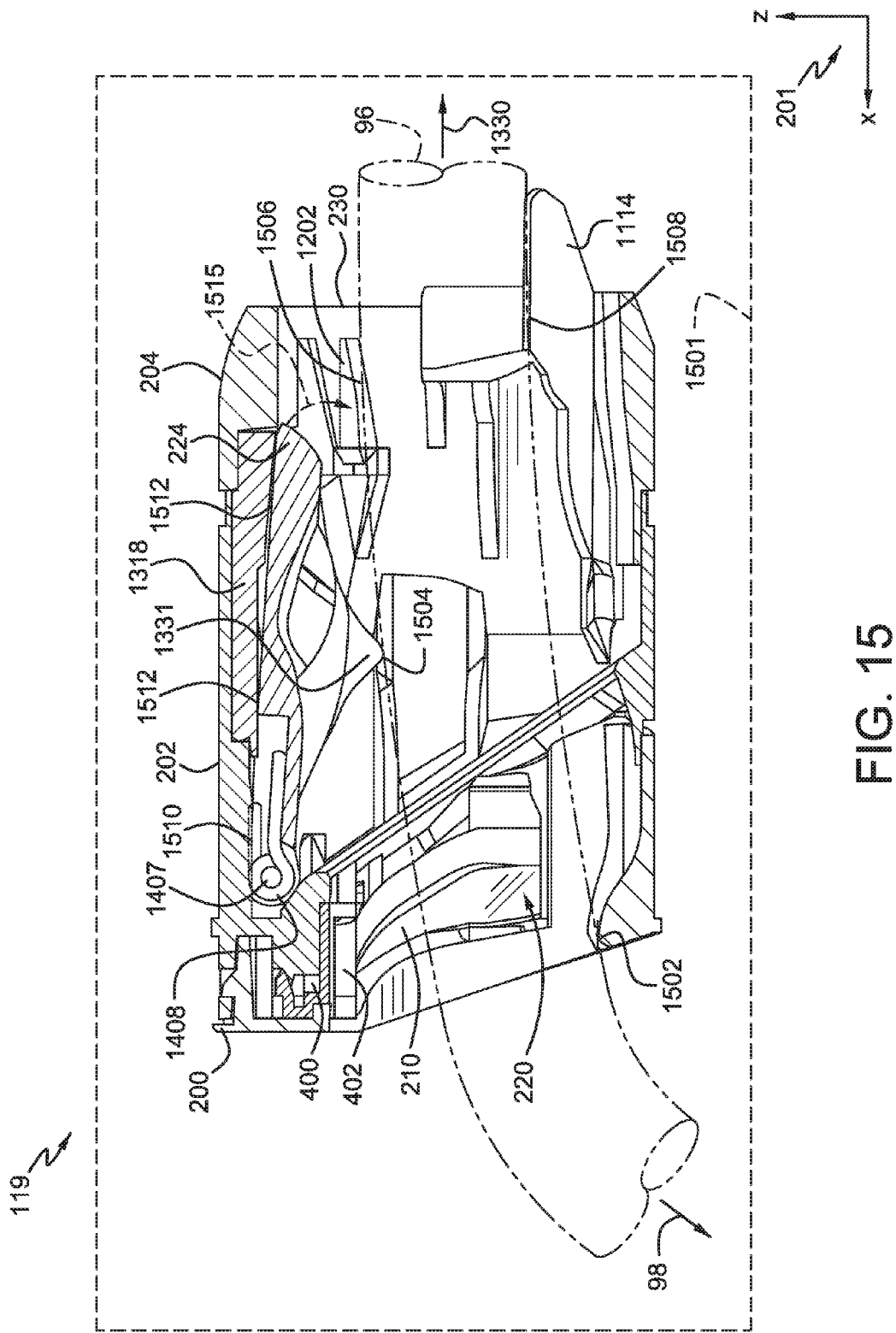
FIG. 15 shows a cross sectional view of the capless refueling mechanism with a fuel nozzle inside a nozzle passage of the fuel mechanism.
Figure 16:
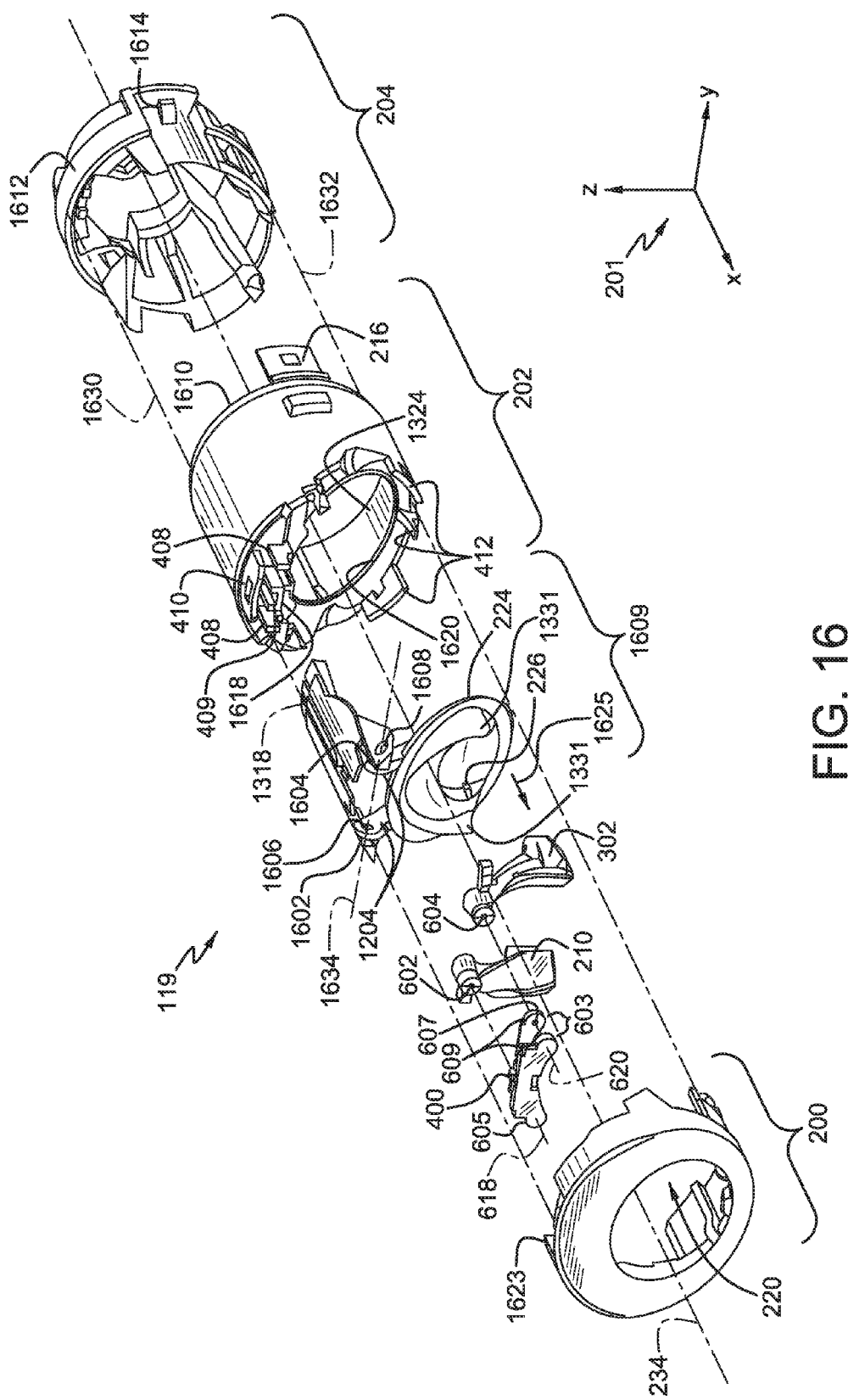
FIG. 16 shows a first exploded view of the capless refueling mechanism.
Figure 17:
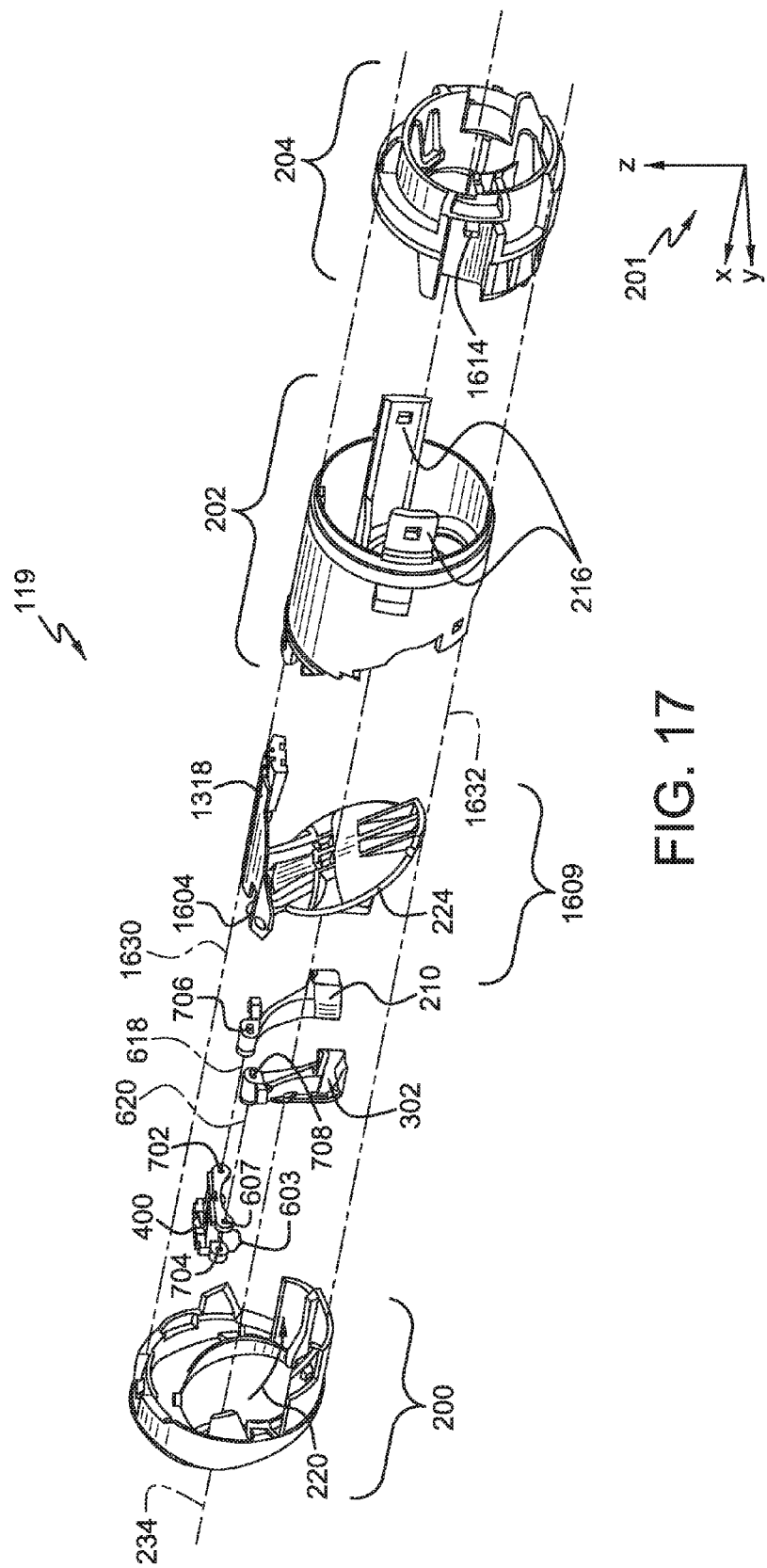
FIG. 17 shows a second exploded view of the capless refueling mechanism.

A first and second cross sectional view of a capless refueling port are shown at FIGS. 13-14. A mode of attaching the guide plate to a filler pipe and rear ramped opening element is disclosed at FIGS. 13-14. Further, details on the misfueling inhibitor in an opening between the guide plate and filler pipe, and a sealing door mounted inside an interior region of the fuel mechanism are disclosed with reference to FIGS. 13-14. FIG. 15 shows cross sectional view of the capless refueling mechanism with the fuel nozzle inside the fuel mechanism during refueling. A mode of actuating the first adjustable pendulum arm, and the sealing door of the fuel mechanism is disclosed with reference to FIG. 15. FIGS. 16-17, show a first and second exploded view of the capless refueling depicting the guide plate, filler pipe, components of the misfueling inhibitor, and sealing door.

FIGS. 1-17 show example configurations with relative positioning of the various components of the capless refueling mechanism. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 1, an example vehicle system 100 shows an engine system 108 coupled to a fuel system 118. In some examples, engine system 108 may be a diesel engine. However, in other examples, engine system 108 may be a different type of engine system such as a gasoline engine or a dual fuel type engine that may be fueled with gasoline and an alcohol fuel blend. The vehicle may include body sheet material, such as sheet metal, as shown herein. Further, although not shown, vehicle 100 may further include a transmission, cab, or other components.

The engine system 108 includes an engine block 110 having a plurality of cylinders 130. The engine system 108 may also include an engine intake 123 and an engine exhaust 125. The engine intake 123 includes a throttle 162 fluidly coupled to an engine intake manifold 144 via an intake passage 142. The engine exhaust 125 includes an exhaust manifold 148 leading to an exhaust passage 135 that routes exhaust gas to the ambient atmosphere. The engine exhaust 125 may include one or more emission control devices 170, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 118 includes a fuel tank 120 coupled to a fuel pump system 121. For example, fuel tank 120 may store one or more liquid fuels, including diesel, gasoline, alcohol fuel blends etc. The fuel pump system 121 may include one or more pumps for pressurizing fuel delivered to the injectors of engine system 106, such as the example injector 166 shown. While only a single injector 166 is shown coupled to the engine, additional injectors are provided for each cylinder. It will be appreciated that fuel system 118 may be a return-less fuel system, a return fuel system, or various other types of fuel system. Fuel tank 120 may include a temperature sensor 146 disposed therein. A fuel level sensor 103 may be included in fuel tank 120 to determine an amount of fuel in the fuel tank. For example, fuel level sensor 103 may include an arm 101 coupled to a float 102. In this example, the position of the float 102 on the top surface of the fuel volume may be used to determine a fuel level in the fuel tank.

A fuel filler passage 111 may be coupled to fuel tank 120 to direct fuel into the fuel tank during refueling. A capless fueling mechanism 119 may be coupled to fuel filler passage 111. As described in more detail below, the capless refueling mechanism may include nozzle chamber 105, a misfueling inhibitor device with pendulum arm 210 and sealing door 224 pivotably hinged to an upper wall of the fuel mechanism. The nozzle chamber 105 may at least partially penetrate an outer surface of vehicle 100 so that fuel may be replenished into the fuel tank via an external fuel source at a location shown by arrow 98. For example, fuel may be replenished in fuel tank 120 via fuel dispensing device 97 at a refueling pump station. The misfueling inhibitor may be sized to reduce a possibility of fuel nozzles (with diameters outside an allowable range of nozzle diameters) from opening sealing door 224, and may reduce occurrences of misfueling in the capless fueling mechanism. For example, in a diesel engine, the misfueling inhibitor may be configured to permit a standard-sized diesel fuel nozzle to open the sealing door and prevent a gasoline fuel nozzle, which may be smaller than the diesel fuel nozzle, from opening the sealing door. In one example, the standard-sized diesel fuel nozzles may include a low flow rate nozzle with a first flow rate of less than 12 gpm, and a high rate flow nozzle with a second flow rate of less than 25 gpm.

Further, the sealing door 224 may be held in place by one or more latches to seal off the fuel tank, and may be opened by inserting the fuel nozzle, such as nozzle 96 of fuel dispensing device 97 into the nozzle chamber 105. For example, when a correctly sized fuel nozzle (e.g., a fuel nozzle sized to correspond to a specific type a fuel that combusted by the engine) is inserted into the capless refueling mechanism, the misfueling inhibitor may allow the fuel nozzle to open the sealing door and dispense fuel into the fuel tank. In one example, the correctly sized fuel nozzle may include low flow rate diesel nozzles with diameters in a range of 23.6-24.5 mm and high flow rate diesel nozzles with diameters that range from 30.1 mm to 37.0 mm. However, when a fuel nozzle with a diameter outside the allowable range of nozzle diameters is inserted into the fueling mechanism, the misfueling inhibitor or sealing door may remain closed to reduce or minimize occurrences of misfueling. In one example, fuel nozzles with diameters outside the allowable range of nozzle diameters may include a gas nozzle with diameters in a range of 20.4-21.5 mm, and a urea nozzle with diameters ranging from 18.5 mm to 19.5 mm. In both cases, the misfueling inhibitor or sealing door may remain closed when the gas or urea nozzle is inserted into the fueling mechanism, preventing the fuel nozzle from dispensing fuel into the fuel tank. Examples of the capless refueling mechanism 119 are described in detail below with reference to FIGS. 2-17.

In this way, the system of FIG. 1 provides for a vehicle system, comprising: a fuel passage coupled to a fuel tank of the vehicle; and a capless refueling mechanism including a first end coupled to the fuel passage and a second end facing an exterior of the vehicle, the mechanism including: an outer body including an opening fluidly coupled with the fuel passage; a sealing door rotatably coupled to the body, forward of the opening relative to the exterior of the vehicle, and including a first mating feature; and a pair of adjustable arms rotatably coupled to the body, forward of the door, and including a second mating feature adapted to mate with the first mating feature.

Turning to FIGS. 2-17, a capless refueling mechanism 119 is shown. Specifically, FIGS. 2-7 and 11-17 show different views of the capless refueling mechanism 119 including a first embodiment of a misfueling inhibitor. FIGS. 8-9 shows a second embodiment of a misfueling inhibitor that may be used in the capless refueling mechanism 119 shown in FIG. 10.

As shown in FIG. 2, the capless refueling mechanism 119 includes a guide plate 200, a pendulum arm 210, sealing door 224, filler pipe 202, and rear ramped opening element 204. The capless refueling mechanism (similar to capless refueling mechanism 119 of FIG. 1) may be provided on a fueling system of a vehicle, such as shown in FIG. 1, and may be adapted for use with diesel, gasoline, or other fuel blends dispensed from a fuel dispensing system.

The capless refueling mechanism includes guide plate 200 attached to filler pipe 202, the guide plate having external diameter 222 and external opening 220. The filler pipe 202 has an internal opening (as shown at FIGS. 13-14) which is aligned with the external opening 220 along port axis 234 to form the main opening of the capless refueling mechanism. The filler pipe may be attached to rear ramped opening element 204 via latch 216. A distal end 230 of the ramped opening element may be fluidly connected to a fuel passage leading to an onboard vehicle fuel tank (such as fuel passage 111 connected to fuel tank 120 at FIG. 1). The guide plate, filler pipe and rear ramped opening element may be made of plastic composite or other suitable materials such as polyphthalamide, acetal, stainless steel, etc. The capless refueling mechanism may be attached to a pipe structure of the fueling system via latching element 214.

The external opening 220 in the guide plate 200 is adapted and sized to receive a fuel nozzle of a fuel dispensing system (such as fuel nozzle 96 of fuel dispensing system 107 at FIG. 1). A bottom wall of the external opening has guide ribs 206 and 207 to guide the fuel nozzle upon insertion into the fuel mechanism. Further, a front end of the external opening is defined by circular edge 208 whose lower portion is adapted to hold the fuel nozzle during refueling. An adjustable pendulum arm 210 disposed within the external opening, and attached to a pivot mounting block (as disclosed further in FIG. 4) mounted in an upper front portion of the guide plate, allows a fuel nozzle that is sized to fit in the external opening to be inserted into the fuel mechanism during refueling. The pendulum arm 210 allows for rotational and translational motion (about a hinge location), and may be adjusted to swing outward (e.g., away from vertical axis 236) when the fuel nozzle is inserted into the external opening during refueling.

A sealing door 224 is mounted behind the pendulum arm, with an upper end of the door attached to an upper interior region of filler pipe 202 via a latch mechanism disclosed in detail below with reference to FIGS. 13-17. For example, the sealing door may be positioned forward of the external opening and a pair of pendulum arms may be positioned forward of the door within a fuel port, relative to a central port axis, the pair of pendulum arms positioned between an exterior of a vehicle in which the capless refueling mechanism is installed and the external opening. When closed, the sealing door seals off the fuel tank from the external opening to reduce or minimize fuel vapor emissions to the atmosphere. An indented portion 226 and curved edge 228 defined in a front surface of the sealing door may be designed to receive and guide the fuel nozzle into the fuel mechanism during refueling. The indented portion has a circular opening, and is recessed into the sealing door by an amount proportionate to a fuel nozzle length needed to move the door to an open position, the fuel nozzle sized to fit the external opening 220. Once inside the fuel mechanism, the fuel nozzle may move the sealing door to open inward until a back surface of the door faces an upper wall of the filler pipe, with the front surface of the door facing a bottom wall of the filler pipe. Side opening 212 in the fuel mechanism may provide extra clearance for the pendulum arms, when the arms are moved to their extreme most position during refueling. In this way, the extra clearance allows for a reduced overall package size of the capless refueling mechanism.

Turning to FIG. 3, a front view of capless refueling mechanism 119 is shown. Specifically, FIG. 3 shows a view of the capless refueling mechanism 119 including guide plate 200, guide ribs 206 and 207, a first embodiment of the misfueling inhibitor composed of pendulum arms 210 and 302, and the sealing door 224.

As shown, a front view of the capless refueling mechanism comprising a fuel port is depicted with a pair of pendulum arms 210 and 302, and the sealing door 224 disposed within an inner region of guide plate 200. The guide plate 200 has the external opening whose front inlet is defined by circular edge 208 with diameter 310. The guide plate whose outer diameter is defined by external diameter 222, may be partially attached to a vehicle body via latching element 214 attached at diametric ends of the fuel mechanism. The external opening may be adapted and sized to receive the fuel nozzle of the fuel dispensing system (such as fuel nozzle 96 of fuel dispensing system 107 at FIG. 1). A bottom wall of the external opening has guide ribs 206 and 207 to hold and guide the fuel nozzle into the fuel mechanism during refueling.

The pendulum arms 210 and 302 attached to a pivot mounting block (shown in detail at FIGS. 4-5) mounted in an upper interior region of the external opening, allows the fuel nozzle that is sized to fit the external opening to be inserted in the fuel mechanism during refueling. The pendulum arms allow for rotational and translational motion about an arm axis (as shown in detail at FIG. 4), and may be adjusted to swing outward (e.g., away from vertical port axis 236) when the fuel nozzle is inserted into the external opening during refueling. For example, the capless refueling mechanism may be movable between a first position where the pair of pendulum arms mate with the sealing door and the door covers the external opening, and a second position where the pair of pendulum arms may be rotated about an arm axis away from the sealing door, with the door pivoted inward into an interior of the fuel port, and away from the external opening. In one example, the pair of pendulum arms may be adjusted to the first position (prior to insertion of the fuel nozzle), with the first and second pendulum arm defining an upper clearance 304, middle clearance 306 and lower clearance 308, each clearance defined between the pair of pendulum arms. In another example, the upper clearance may be larger than the middle and lower clearance. In yet another example, the bottom clearance may be equal or larger than a diameter of the fuel nozzle inserted into the fuel port during refueling. In other examples, a space between each of the pair of pendulum arms may be narrower than the external opening when the capless fueling mechanism is adjusted to the first position, and the space between each of the pair of arms may be larger than the external opening when the fueling mechanism is adjusted to the second position.

For example, the middle and lower clearance may exceed a threshold clearance when the fuel nozzle is inserted into the fuel mechanism during refueling. The threshold clearance may be based on a diameter of the fuel nozzle that falls within an allowable range of nozzle diameters. In one example, the allowable range of nozzle diameters may include a low flow rate diesel nozzles with nozzle diameters in a range of 23.6-24.5 mm. In another example, allowable range of nozzle diameters may include a high flow rate diesel nozzle with nozzle diameters in a range of 30.1-37.0 mm. The pair of pendulum arms may be further adjusted to swing inward (e.g., towards the vertical axis 236) after refueling and upon removing the fuel nozzle out of the fuel mechanism. In this way, the pair of pendulum arms may allow entry of low and high flow rate diesel fuel nozzles into the fuel mechanism during refueling while restricting entry of fuel nozzles with diameters outside the allowable range of nozzle diameters, to prevent misfueling.

A sealing door 224 is be mounted behind pendulum arms 210 and 302, and attached to an upper interior region of the fuel mechanism via a latch mechanism (shown in details at FIGS. 13-17). For example, when the capless refueling mechanism is in the first position, the first mating structure of each of the pair of pendulum arms may interlock with a corresponding second mating structure on the sealing door. When closed, the sealing door seals off the fuel tank to reduce fuel vapor emissions to the atmosphere via the external opening. An indented portion 226 defined in a front surface of the sealing door may be designed to receive and guide the fuel nozzle upon insertion into the fuel mechanism. For example, the indented portion may be sized to receive a fuel nozzle with a diameter equal to a size of the indented opening. Once inside the capless fueling mechanism, the fuel nozzle may move the sealing door to open inward, and allow fuel to be dispensed into the fuel tank. In this way, the capless refueling mechanism may reduce or minimize fuel vapor emissions from the fuel tank to the atmosphere.

Turning to FIG. 4, a partial view of the capless refueling mechanism 119 is shown with the guide plate removed to expose an interior region of the fueling mechanism. As depicted, the misfueling inhibitor may comprise the first adjustable pendulum arm 210 and second adjustable pendulum arm 302, both arms securely attached to pivot mounting block 400. Further, sealing door 224 mounted to an upper interior region of the filler pipe 202 is also shown.

Upon removing the guide plate (shown in FIG. 2) of the capless refueling mechanism, a partial view depicting latch elements 410 and 412 for attaching the filler pipe to the guide plate is shown. In addition, details of pivot mounting block 400 for attaching the first and second pendulum arm of the misfueling inhibitor are shown. A front end of the filler pipe has upper latch element 410 and a plurality of lower latch elements 412 for attaching the filler pipe to the guide plate. The pivot mounting block 400 may be centrally mounted into a slot in a front upper end of the filler pipe formed by a bottom portion of planar surfaces of ramp elements 408 and 409. An upper portion of the pivot mounting block abuts and seals against the bottom portion of the planar surfaces of the ramp elements 408 and 409 at contact interfaces 413 and 415, respectively. A curved portion 406 formed in a bottom region of the pivot mounting block is designed to allow easy entry and removal of the fuel nozzle from an interior passage of the capless refueling mechanism during refueling. Details of attaching pendulum arm 210 and 302 to the pivot mounting block are disclosed below with reference to FIGS. 6-7.

The first and second pendulum arms are hinged at extreme ends of the pivot mounting block forming a swivel joint at 402 and 404, respectively. For example, each arm of the pair of pendulum arms may include a first end rotatably coupled to the pivot mounting block and a second end including a first mating feature adapted to mate with the sealing door, as shown by the first mating feature 434 on pendulum arm 302. A first flange element 416 formed in an upper portion of the first pendulum arm 210 allows the first pendulum arm to be partially mounted into side slot 420 in the front end of the filler pipe. Likewise, second flange element 418 formed in an upper portion of the second pendulum arm allows the second pendulum arm to be partially mounted into side slot 422 in the filler pipe. When mounted to the pivot mounting block, a curved vertical portion 436 of each arm of the first and second pendulum arm may face the external opening in the guide plate. The first and second pendulum arm may be allowed to swing away from vertical axis 236 (upon insertion of the fuel nozzle during refueling) as shown by arrows 424 and 426, respectively. Additionally, the pair of pendulum arms may be further adjusted to swing inward towards vertical port axis 236, (after refueling and upon removal of the fuel nozzle from the fuel mechanism) as shown by arrows 428 and 430.

For example, the pendulum arms may be adjusted to a first position, prior to insertion of the fuel nozzle in the fuel mechanism, with the first and second pendulum arm defining an upper clearance 304, middle clearance 306 and lower clearance 308, as shown at FIG. 5. In one example, the upper clearance may be larger than the middle and lower clearance but smaller than the external opening defined by circular edge 208 of the fuel mechanism. In another, example, the bottom clearance may be equal to a diameter of the indented portion defined in the front surface of the sealing door. In yet another example, the middle and lower clearance may exceed a diameter of the fuel nozzle inserted into the fuel mechanism during refueling. In one example, the diameter of the fuel nozzle may fall within an allowable range of nozzle diameters of 23.6 mm-37.0 mm. In this way, the pair of pendulum arms may allow entry of a fuel nozzle that is sized to fit the external opening of the fuel mechanism during refueling while preventing entry of fuel nozzles with diameters outside the range of allowable nozzle diameters to reduce or minimize misfueling.

A sealing door 224 mounted behind adjustable pendulum arm 210 and 302, may be attached to an upper interior region of the filler pipe 202 (as shown in detail at FIGS. 12-13). The sealing door may be mounted inside the fuel mechanism such that the front surface of the door with indented portion 226 faces toward the adjustable pendulum arms while the back surface of the door faces an inner passage leading to a fuel tank as disclosed further at FIGS. 12-13. For example, the front surface of the sealing door may include an indented portion having a radius of curvature adapted to receive a portion of the fuel nozzle. In one example, the indented portion may be sized to receive and guide the fuel nozzle into the fuel port during refueling. Further, circular edge 228 of a lower end of the sealing door allows a base of the fuel nozzle to glide in and out of the fuel port during refueling. The sealing door may be further adjusted to close after refueling and upon removing the fuel nozzle from the fuel mechanism. When closed, the sealing door seals off the fuel tank to reduce fuel vapor emissions to the atmosphere. In this way, the capless refueling mechanism may reduce or minimize fuel vapor emissions from the fuel tank to the atmosphere while minimizing entry of contaminants into the fuel tank after refueling.

Referring to FIGS. 6-7, a first and second exploded view of a first embodiment of a misfueling inhibitor for the capless fueling mechanism 119 is shown with pivot mounting block 400, a first pendulum arm 210 and a second pendulum arm 310. The first and second pendulum arm may be attached to the pivot mounting block to allow for rotational and translational arm motion about an arm axis.

The pivot mounting block 400 has a plurality of brackets 605 and 609, each pair of brackets defining a side opening in the pivot mounting block such as side opening 603 formed by bracket 609. Each side opening may be configured to allow the pendulum arm to be securely attached to the pivot mounting block. The first and second pendulum arms may be attached to pivot mounting block 400 with a curved vertical portion of each arm facing an external opening of the fuel mechanism as disclosed earlier at FIG. 4. When assembled, bushing 621 of the first pendulum arm 210 may be mounted within its respective opening such that slot 602 and 706 of the first pendulum arm align with slot 702 along first arm axis 618. The first arm axis is relatively parallel to the central axis of the capless refueling mechanism. The first pendulum arm may be attached to a first end of the pivot mount block by inserting a first rod through slot 602, and extending the rod from front end 610 to backend 614 of the first pendulum arm, such that a distal end of the rod may extend out of tapered slot 706 and rest inside slot 702. Likewise, bushing 622 of the second adjustable pendulum arm 302 may be contiguously mounted within side opening 603 such that slot 604 and 708 of the second pendulum arm align with slot 607 and 704 along second arm axis 620. Similarly, the second arm axis is relatively parallel to the central axis of the capless refueling mechanism. The second pendulum arm may be securely attached to pivot mounting block 400 by inserting a second rod through slot 604, and extending the rod (along second arm axis 620) from front end 612 to backend 616 of the second pendulum arm, such that a distal of the second rod may extend out of tapered slot 708 and rest inside slot 607. The tapered slots in both pendulum arms, allows the arms to be rotatably coupled to the fuel mechanism, providing for a wide range of rotation arm motion.

When mounted in a front end of a filler pipe (as disclosed earlier at FIGS. 4-5), first guide flange 416 of the first pendulum arm and second guide flange 418 of the second pendulum arm may be in face contact with planar surfaces of the slot in the front upper region of the filler pipe as shown in FIGS. 4-5. When in a first position, hooked protrusions 606 and 608 on the first and second pendulum arm, respectively mate with extensions on a front surface of the sealing door of the capless refueling mechanism, as disclosed further below with reference to FIGS. 13-14. Each guide flange of the first and second pendulum arms allows each pendulum arm to be partially restrained while allowing for rotational and translational movement. Upon insertion of a fuel nozzle into a fuel mechanism, the first and second pendulum arm may move to a second position along direction 424 and 426, respectively. Further, the hooked protrusions of the first and second pendulum arm allow each arm to abut against the filler pipe when the arms move to their extreme most position during refueling.

Turning to FIG. 8, an alternative embodiment of the refueling mechanism is shown including pendulum arm 800. The pendulum arm 800 may be attached to a pivot mounting block of the fuel mechanism in a manner that allows for translational motion about an arm axis as disclosed earlier at FIGS. 6-7. The pendulum arm comprises bushing 802 and vertical arm 803. The bushing 802 has an opening 814 extending from front end 810 to back end 812. A circular flange portion 804 of the bushing has a slot to receive rod 806 of the vertical arm 803, such that the bushing may be securely attached to the vertical arm. Guide pin 808 on the vertical arm, allows the pendulum arm 800 to be attached to a recessed opening in a filler pipe as disclosed at FIGS. 9-10. When mounted in the capless fuel mechanism, lower portion 816 of the pendulum arm may be configured to swing in direction 426 upon insertion of a fuel nozzle into the fuel mechanism.

Recessed opening element 900 disposed in a side region of filler pipe 202 (shown in FIGS. 9-10), has recessed opening 902 and 904, with a ridge element 906 separating the two openings. As shown in FIG. 10, the pendulum arm may be attached to filler pipe 202 by inserting guide pin 808 into recessed opening 902 and 904. The guide rod may be mounted within the recessed openings such that the pendulum arm 800 may be allowed to move rotational. The pendulum arm may be securely attached to a pivot mounting block (not shown) mounted onto the filler pipe by inserting a rod through opening 814, and extending the rod from front end 810 to backend 812 of bushing 802. The pivot mounting block allows the pendulum arm to move along y axis of system 201. For example, inserting a correctly sized fuel nozzle into the fuel mechanism during refueling, may move the pendulum arm from a first position to a second position, allowing the fuel nozzle to enter a nozzle passage to dispense fuel into a fuel tank. The pendulum arm may be further adjusted to move from the second position back to the first position after refueling, and upon removing the fuel nozzle from the fuel mechanism. In this way, the pendulum arm may control access into the fuel mechanism, allowing the fuel nozzle with a suitable diameter to dispense fuel into the fuel tank while restricting entry of an incorrectly sized fuel nozzle to reduce instances of mis-fueling.

Referring to FIG. 11, a view of a misfueling inhibitor mounted in front of a sealing door 224, with the misfueling inhibitor comprising of a first pendulum arm 210 and a second pendulum arm 310 attached to pivot mounting block 400. The pivot mounting block enables the first and second pendulum arm to rotate and translate about a point of attachment.

As shown, the first pendulum arm 210 may be securely attached to pivot mounting block 400 by a first rod extending from front end 610 to backend 614 along a first arm axis 618, such that backend 614 may move along direction 1100 when the first pendulum arm is actuated to open by a fuel nozzle during refueling. Opening the first pendulum arm involves moving the arm in direction 424. Further, front end 610 may be adjusted to move in direction 1104 when the arm is actuated to close after refueling and upon removal of the fuel nozzle from the fuel mechanism. Likewise, the second pendulum arm 302 may be securely attached to pivot mounting block 400 by a second rod extending from front end 612 to backend 616 along second arm axis 620, such that backend 616 may move along direction 1102 when the second pendulum arm is actuated to open by the fuel nozzle during refueling. Opening the second pendulum arm involves moving the second pendulum arm in direction 426. Furthermore, front end 612 may be adjusted to move in direction 1106 when the arm is actuated to close after refueling and upon removal of the fuel nozzle from the fuel port. Sealing door 224 may be mounted within an interior passage of the fuel mechanism such that bottom portion 1110 may be positioned in front of internal slot 1112 which is a portion of an internal passage of a rear ramped opening element (as disclosed further in FIGS. 13-14). The internal passage is fluidly connected to a fuel passage of a fuel tank (such as fuel passage 111 of fuel tank 120 at FIG. 1). Internal walls 1108 of internal slot 1112 comprise lower guide element 1114 of rear ramped opening element. Details showing backend of the sealing door and guide elements of the rear ramped opening element are disclosed at FIG. 12.

A detailed view of a distal end of the fuel mechanism depicting lower guide elements 1114 and upper guide elements 1202 of the rear ramped opening element 204, and sealing door 224 is shown in FIG. 12. The lower guide elements 1114, each having a circular member that joins a plurality of ribs, are attached symmetrically to a lower portion of the rear ramped opening element. Similarly, upper guide elements 1202, each having a circular member that joins a plurality of ribs, are attached symmetrically to an upper portion of the rear ramped opening element. The lower and upper guide elements are configured with planar edges that allow the fuel nozzle to be held and guided into the fuel mechanism during refueling. The sealing door 224 may be mounted inside the fuel mechanism, such that the sealing door separates rear ramped opening element from an external opening in front of the door (as further disclosed in FIGS. 13-14), with upper appendages 1204 contacting an upper portion of filler pipe 202. A base region of the sealing door rests in face contact with a bottom wall of internal slot 1112 in the rear ramped opening element. The sealing door may be moved to an open position when the fuel nozzle is inserted into the fuel mechanism during refueling. After refueling and removing the fuel nozzle from the fuel port, the sealing door may close to seal off the fuel tank from the atmosphere. In this way, the sealing door of the capless fueling mechanism, may be adjusted to open upon insertion of the fuel nozzle into the fuel mechanism during refueling, and may be further adjusted to close after refueling, sealing off the fuel tank to reduce or minimize fuel vapor emissions to the atmosphere.

Turning to FIGS. 13-14, a first cross sectional view along plane 1301 and a second cross sectional view along plane 1401 of the capless refueling mechanism 119 are shown. As shown, distal end 1304 of the guide plate is attached to front end 1302 of the filler pipe such that an upper portion of the guide plate and filler pipe may be in face contact along contact interfaces 1306 and 1310. Similarly, a lower portion of the guide plate and filler pipe may be in face contact along contact interface 1312. Distal end 1314 of the filler pipe may be attached to a front portion of rear ramped opening element 204 such that surfaces of the filler pipe and rear ramped opening element make contact along interface 1316, defining a circumferential region of contact between the filler pipe and rear ramped opening element. When the guide plate, filler pipe and ramped opening element are assembled together, external opening 220 and internal opening 1300 are aligned along port axis 234 to form the main opening of the capless refueling mechanism.

A first pendulum arm 210 attached to pivot mounting block 400 partially comprises a misfueling inhibitor of the capless refueling mechanism. Pivot mounting block 400 may be mounted and secured in a frontal region between guide plate 200 and filler pipe 202 such that outer surfaces of the pivot mounting block may be in face contact with inner surfaces of the guide plate and filler pipe along interface 1326 and 1328, respectively. The first pendulum arm 210 may be securely attached to a first end of the pivot mounting block forming swivel joint 402. Likewise, a second pendulum arm (not shown), may be securely attached to a second end of the pivot mounting block forming a second swivel joint. For example, each arm of the pair of pendulum arms may include a first end rotatably coupled to the pivot mounting block and a second end including a first mating feature, where the pivot mounting block is coupled to a top edge of an outer circumference of a body and the second end of each arm extends from the pivot mounting block toward a bottom edge of the outer circumference, along the outer circumference and across the external opening.

In one example, the body may include the filler pipe 202 and rear ramped opening element 204. In another example, the first mating feature 434 on the pendulum arm, may abut against extension 1331 of the sealing door when the arm is in a first position. The pair of pendulum arms may be allowed to translate from the first position to a second position when actuated by a fuel nozzle during refueling. For example, the pair of pendulum arms may be movable between the first position where the pair of arms are coupled with the sealing door and the door covers the external opening, and a second position where the pair of pendulum arms are rotated away from a central axis and the door, when the door is rotated away from the external opening. Further, the second end of each arm may include a hooked protrusion (disclosed at FIGS. 6-7) adapted to mate with an extension 1331 on a front surface of the sealing door when the pendulum arms are in the first position.

Sealing door 224 may be mounted within slot 1324 defined by circular edge 1323 and front edge 1325 of the rear ramped opening element. As depicted in FIG. 14, top portion of the sealing door may be attached via hinge 1407 to latch device 1318 mounted to a top internal wall of the filler pipe and rear ramped opening element such that a back end of the sealing door leans along axis 1402. A spring 1408, attached to the top portion of the sealing door, allows the door to open inward along direction 1332 when actuated by a fuel nozzle. The sealing door may be angled relative to central axis 234 and the opening forming first tilt angle 1404. As an example, the first tilt angle of the sealing door may be more than 20 degrees. In another example, the sealing door may be angled relative to the central axis and the opening forming a second tilt angle 1405 (defined between axes 1402 and 1403). The latch device 1318 abuts and seals against the top internal wall of the filler pipe and rear ramped opening element along contact interfaces 1320 and 1322, respectively.

During refueling, a fuel nozzle sized to fit the main opening may be inserted into external opening 220 and the adjustable pendulum arm 210 may move in direction 424 (as shown in FIG. 13) allowing the fuel nozzle to enter the fuel mechanism. Guide ribs 206 and 207 in a bottom wall of the external opening 220, guide the fuel nozzle through the fuel mechanism. For example, the guide ribs may comprise a plurality of ribs arranged along a portion of an internal surface of the fuel mechanism, along a direction substantially parallel to the central axis. Once in the fuel mechanism, a front end of the fuel nozzle may be held inside indented portion 226 enabling a slight force applied to the nozzle to move the sealing door to an open position along direction 1332. Further details on opening and closing of the sealing door during and after refueling are disclosed further at FIG. 15. Upon opening the sealing door, the fuel nozzle is further guided into internal passage 1300 by lower guide element 1114 and upper guide elements 1202. Distal end 230 of the rear ramped opening element may be fluidly connected to a fuel passage of a fuel tank (such as fuel passage 111 of fuel tank 120 at FIG. 1). In this way, the fuel nozzle of a fuel dispensing system may be allowed to dispense fuel into the fuel tank.

In this way, the capless refueling mechanism may comprise a body which include the filler pipe and ramped opening element, the body having the central axis and including an interior passage and an opening positioned forward of the interior passage; a door pivotably coupled to the body, forward of the opening, the door angled relative to the central axis, where the opening is only covered by the door and no additional caps; and a pair of arms, each rotatably coupled to the body and positioned forward of the door.

Turning to FIG. 15, a cross sectional view along plane 1501 of a capless refueling mechanism 119 is shown. A mode of actuating an adjustable pendulum arm mounted within an external opening of the fuel mechanism is disclosed. Further, modes of opening and closing a sealing door, separating the external opening from an internal passage of the fuel mechanism, when a fuel nozzle is inserted into the fuel mechanism during refueling is disclosed.

Insertion of fuel nozzle 96 into the fuel mechanism during refueling, allows pendulum arm 210 to open (as disclosed at FIGS. 13-14), allowing the fuel nozzle to enter external opening 220 and open sealing door 224. The fuel nozzle may be extended through internal passage 1300 until a tip of the nozzle extends beyond distal end 230 of rear ramped opening element 204. A backend of the open sealing door may be in face contact with a top portion of an internal wall of the filler pipe along contact interface 1510. The backend of the sealing door may also contact a bottom surface of latch device 1318 along contact plane 1512. Once the fuel nozzle is inside the fuel mechanism, guide ribs 206 and 207 at a bottom wall of external opening 220, hold a rear end of the nozzle along contact interface 1502. Similarly, a top middle portion of the fuel nozzle makes face contact with extension 1331 on the sealing door, keeping the door open. Likewise, lower guide element 1114 at a bottom wall of the rear ramped opening element makes face contact with a bottom frontal portion of the fuel nozzle along contact interface 1508. Further, the upper guide element 1202 at a top wall of the rear ramped opening element makes face contact with a top frontal portion of the fuel nozzle along contact interface 1506.

Once inside the fuel mechanism, the fuel nozzle 96 may dispense fuel into a fuel tank via a fuel passage (such as passage 122 of fuel tank 120 at FIG. 1) located in a direction of arrow 408. Upon completing refueling, the fuel nozzle may be removed from the fuel mechanism to allow the sealing door to close in direction 1515, and the adjustable pendulum arm 210 may move to its initial position prior to refueling. When closed, the sealing door seals off the fuel tank from the external opening to reduce or minimize fuel vapor emissions to the atmosphere. In this way, the capless fueling reduces fuel vapor emissions to the atmosphere while minimizing instances of mis-fueling by restricting entry of incorrectly sized fuel nozzles into the fuel mechanism.

Referring now to FIGS. 16-17, a first and second exploded view depicting different components of a capless refueling mechanism 119 are shown. The components include guide plate 200, pivot mounting block 400 for attaching adjustable pendulum arms 210 and 302, sealing door 224 attached to latch device 1318, filler pipe 202, and rear ramped opening element 204.

Sealing door 224 may be securely attached to latch mechanism 1318 by aligning opening 1606 (on appendages 1204) with opening 1608 in front limbs 1607, along latch axis 1634 such that a rod or other suitable fastener may be inserted through a first set of aligned openings forming joint 1602, and extending the rod to a second set of openings forming a second joint 1604. The latch axis is relatively perpendicular to the central axis of the capless refueling mechanism. By inserting the rod or other suitable fastener through the aligned openings, the sealing door may be securely attached to the latch mechanism at joint interfaces 1602 and 1604. The latch mechanism may enable the sealing door to be opened and closed, with joints 1602 and 1604 acting as pivots. After attaching sealing door to the latch mechanism, assembly 1609 may be mounted inside opening 1324 of filler pipe 202 as disclosed earlier at FIG. 13, such that the latch mechanism may be attached to a top interior wall of the filler pipe, with a circular edge of the door sealing against an inner edge of annular opening 1620.

Once mounted, a front surface of the sealing door, with indented portion 226 and extension 1331, may face direction 1625 (aligned with x-axis of coordinate system 201). For example, the sealing door may be rotatably coupled to an upper wall of the filler pipe, forward of a main opening relative to an exterior of a vehicle, and including a first mating feature; and a pair of pendulum arms rotatably coupled to the filler pipe, forward of the sealing door, and including a second mating feature adapted to mate with the first mating feature. The first mating feature may include two extensions positioned on opposite sides of an outer edge of the sealing door and extending outward from an outer surface of the sealing door, toward the exterior of the vehicle, while the second mating feature includes two hooked protrusions, one on each arm of a pair of pendulum arms. Further, the outer surface of the sealing door may include indented portion positioned between the two extensions and having a radius of curvature adapted to receive an outer surface of a fuel nozzle.

The pendulum arms 210 and 302 may be attached to pivot mounting block 400 and then mounted onto the filler pipe 202. A first pendulum arm 210 may be mounted within a side opening (not shown) of a first bracket 605, with slot 602 and 706 aligned with opening 702 in the first bracket along first arm axis 618, such that a first rod may be inserted through the aligned opening to securely attach the first pendulum arm to the pivot mounting block as disclosed earlier at FIGS. 6-7. Similarly, a second pendulum arm 302 may be mounted inside opening 603 of a second bracket 609, with slot 604 aligned with opening 607 and 704 in the second bracket along second arm axis 620, such that a second rod may be inserted through the aligned openings to securely attach the second pendulum arm to the pivot mounting block. Once the first and second pendulum arm are securely attached, the pivot mounting block may be mounted to the filler pipe, with an upper part of the mechanism mounted within slot 1618 and touching planar surfaces of upper guide elements 408 and 409. For example, the first and second adjustable arm may be mounted inside the fuel port in such a manner that both pendulum arms are allowed to rotate and translate about a hinge location. The pair of pendulum arms may be adjust to a first position, where the hooked protrusions of the arms mate with the extensions 1331 on the front surface of the sealing door as disclosed earlier. Once mounted to the filler pipe, the first and second adjustable pendulum arm attached to the pivot mounting block comprise a misfueling inhibitor which allows only fuel nozzles sized to fit the main opening to enter the fueling mechanism while restricting entry to fuel nozzles with diameters outside a range of allowable nozzle diameters to reduce occurrences of misfueling. In one example, the allowable range of nozzle diameters may range from 23.6 mm to 37.0 mm.

Upon mounting the pivot mounting block to the filler pipe, the guide plate may be securely attached to a frontal region of the filler pipe by latching distal end 1623 to top latch 410 and bottom latch 412. The top portion of the guide plate and filler pipe may be aligned along top axis 1630. Likewise, the bottom portion of the guide plate and filler pipe may be aligned along bottom axis 1632. Further, the guide plate may be attached to the filler pipe such that external opening 220 aligns with inner opening 1324 along central axis 234 of the fuel port. The top and bottom axis are relatively parallel to the central axis. Further, the filler pipe may be attached to the rear ramped opening element 204 by extending distal end 1610 of the filler pipe over annular region 1612 of the rear ramped element. In addition, side latch 216 on the filler pipe may be latched over side element 1614 to allow the filler pipe to be securely fastened to the rear ramped opening element. Finally, the assembled capless fueling mechanism may be attached to a fuel passage connected to a fuel tank of vehicle (such as fuel passage 111 of fuel tank 120 at FIG. 1). In this way, the capless fueling mechanism may allow opening and closing of the fuel mechanism by actuating the pair of pendulum arms and moving the sealing door with the fuel nozzle during refueling.

In one example, a capless vehicle refueling mechanism comprises: a body including an opening adapted to receive a fuel nozzle; a door pivotably coupled to the body and adapted to cover the opening; a pair of arms, each rotatably coupled to the body about an arm axis arranged parallel to a central axis of the body and each including a first mating structure adapted to mate with the door. In the preceding example additionally or optionally, the door is positioned forward of the opening and the pair of arms are positioned forward of the door within the body, relative to the central axis, the pair of arms positioned between an exterior of a vehicle in which the capless refueling mechanism is installed and the opening. In any or all of the preceding examples, additionally or optionally, the capless refueling mechanism is movable between a first position where the pair of arms mate with the door and the door covers the opening and a second position where the pair of arms are rotated about the arm axis away from the door and the door is pivoted inward, into an interior of the body, and away from the opening. In any or all of the preceding examples, additionally or optionally, in the first position, a space between each of the pair of arms is narrower than the opening, and wherein in the second position, the space between each of the pair of arms is larger than the opening.

Furthermore, in any or all of the preceding examples, additionally or optionally, in the first position, the first mating structure of each of the pair of arms is interlocked with a corresponding second mating structure on the door. In any or all of the preceding examples, additionally or optionally, each arm of the pair of arms includes a first end rotatably coupled to a pivot mounting block and a second end including the first mating feature. In any or all of the preceding examples, additionally or optionally, each arm of the pair of arms includes a curved vertical front surface, a guide flange extending from a top portion of the arm, a hooked protrusion on a back surface of the arm, the back surface opposite the curved vertical front surface, and a tapered opening in a bushing.

In any or all of the preceding examples, additionally or optionally, each arm of the pair of arms includes a curved vertical front surface, a hooked protrusion on a back surface of the arm, the back surface opposite the curved vertical front surface, a guide pin extending from a top portion of the arm, the guide pin having an extended circular rod that fits into a recessed opening in the body to allow rotational arm motion, and a bushing with a circular opening that is adapted to couple the arm to the body.

In other examples, a first surface of the door includes indented portion having a radius of curvature adapted to receive a portion of the fuel nozzle. In any or all of the preceding examples, additionally or optionally, the door is angled relative to the central axis and the opening. Any or all of the preceding examples, may additionally or optionally, further comprise a plurality of ribs arranged along a portion of an internal surface of the body, along a direction substantially parallel to the central axis. Any or all of the preceding examples, may additionally or optionally, further comprise a guide plate coupled to an end of the body, wherein the guide plate includes the opening, with guide ribs disposed on a lower bottom wall of the opening.

Another example of a refueling mechanism comprises: a body having a central axis and including an interior passage and an opening positioned forward of the interior passage; a door pivotably coupled to the body, forward of the opening, the door angled relative to the central axis, where the opening is only covered by the door and no additional caps; and a pair of arms, each rotatably coupled to the body and positioned forward of the door. In any or all of the preceding examples, additionally or optionally, the pair of arms are movable between a first position where the pair of arms are coupled with the door and the door covers the opening and a second position where the pair of arms are rotated away from central axis and door and the door is rotated away from the opening. In any or all of the preceding examples, additionally or optionally, in the first position, a space between the pair of arms is smaller than a diameter of the opening of the body. In any or all of the preceding examples, additionally or optionally, each arm of the pair of arms includes a first end rotatably coupled to a pivot mounting block and a second end including a first mating feature, where the pivot mounting block is coupled to a top edge of an outer circumference of the body and the second end of each arm extends from the pivot mounting block toward a bottom edge of the outer circumference, along the outer circumference and across the opening. In any or all of the preceding examples, additionally or optionally, the second end of each arm includes a hooked protrusion adapted to mate with an extension positioned on an outer edge of the door when the arms are in the first position.

An example refueling system for a vehicle comprises: a fuel passage coupled to a fuel tank of the vehicle; and a capless refueling mechanism including a first end coupled to the fuel passage and a second end facing an exterior of the vehicle, the mechanism including: an outer body including an opening fluidly coupled with the fuel passage; a door rotatably coupled to the body, forward of the opening relative to the exterior of the vehicle, and including a first mating feature; and a pair of arms rotatably coupled to the body, forward of the door, and including a second mating feature adapted to mate with the first mating feature. In any or all of the preceding examples, additionally or optionally, the first mating feature includes two extensions positioned on opposite sides of an outer edge of the door and extending outward from an outer surface of the door, toward the exterior of the vehicle and wherein the second mating feature includes two hooked protrusions, one on each arm of the pair of arms. In any or all of the preceding examples, additionally or optionally, the outer surface of the door includes indented portion positioned between the two extensions and having a radius of curvature adapted to receive an outer surface of a fuel nozzle.

Note that the example systems included herein can be used with various capless refueling system configurations. It will be appreciated that the configurations disclosed herein are exemplary in nature, and that these specific embodiments are not to be considered in a limiting sense, because numerous variations are possible. For example, the above technology can be applied to a vehicle capless refueling system and other vehicle refueling systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A capless refueling mechanism, comprising:
a body including an opening adapted to receive a fuel nozzle;

a door pivotably coupled to the body and adapted to cover the opening;

a pair of arms, each rotatably coupled to the body about an arm axis arranged parallel to a central axis of the body and each including a first mating structure adapted to mate with the door, wherein each arm of the pair of arms includes a curved vertical front surface, a guide flange extending from a top portion of the arm, a hooked protrusion on a back surface of the arm, the back surface opposite the curved vertical front surface, and a tapered opening in a bushing.

2. The capless refueling mechanism of claim 1, wherein the door is positioned forward of the opening and the pair of arms is positioned forward of the door within the body, relative to the central axis, the pair of arms positioned between an exterior of a vehicle in which the capless refueling mechanism is installed and the opening.

3. The capless refueling mechanism of claim 1, wherein the capless refueling mechanism is movable between a first position where the pair of arms mates with the door and the door covers the opening and a second position where the pair of arms are rotated about the arm axis away from the door and the door is pivoted inward, into an interior of the body, and away from the opening.

4. The capless refueling mechanism of claim of claim 3, wherein, in the first position, a space between each of the pair of arms is narrower than the opening, and wherein, in the second position, the space between each of the pair of arms is larger than the opening.

5. The capless refueling mechanism of claim 3, wherein, in the first position, the first mating structure of each of the pair of arms is interlocked with a corresponding second mating structure on the door.

6. The capless refueling mechanism of claim 1, wherein each arm of the pair of arms includes a first end rotatably coupled to a pivot mounting block and a second end including the first mating structure.

7. The capless refueling mechanism of claim 1, wherein each arm of the pair of arms includes guide pin extending from a top portion of the arm, the guide pin having an extended circular rod that fits into a recessed opening in the body to allow rotational arm motion.

8. The capless refueling mechanism of claim 1, wherein a first surface of the door includes an indented portion having a radius of curvature adapted to receive a portion of the fuel nozzle.

9. The capless refueling mechanism of claim 1, wherein the door is angled relative to the central axis and the opening.

10. The capless refueling mechanism of claim 1, further comprising a plurality of ribs arranged along a portion of an internal surface of the body, along a direction substantially parallel to the central axis.

11. The capless refueling mechanism of claim 1, further comprising a guide plate coupled to an end of the body, wherein the guide plate includes the opening, with guide ribs disposed on a lower bottom wall of the opening.

12. A refueling mechanism, comprising:

a filler pipe body having a central axis and including an interior passage an opening positioned forward of the interior passage, and a rear ramped opening element;

a door pivotably coupled to the body, forward of the opening, the door angled relative to the central axis, where the opening is only covered by the door and no additional caps;

a pair of arms, each rotatably coupled to the body and positioned forward of the door; and a latch device hingedly attached to a top portion of the door, the latch device mounted to a top internal wall of the filler pipe body and the rear ramped opening element, the latch device abutting and sealing against the top internal wall of the filler pipe body and the rear ramped opening element along contact interfaces.

13. The refueling mechanism of claim 12, wherein the pair of arms is movable between a first position where the pair of arms is coupled with the door and the door covers the opening and a second position where the pair of arms is rotated away from the central axis and the door and the door is rotated away from the opening, and wherein each arm includes a curved vertical front surface, a guide flange extending from a top portion of the arm, a hooked protrusion on a back surface of the arm, the back surface opposite the curved vertical front surface, and a tapered opening in a bushing.

14. The refueling mechanism of claim 13, wherein, in the first position, a space between the pair of arms is smaller than a diameter of the opening of the filler pipe body.

15. The refueling mechanism of claim 13, wherein each arm of the pair of arms includes a first end rotatably coupled to a pivot mounting block and a second end including a first mating feature, where the pivot mounting block is coupled to a top edge of an outer circumference of the filler pipe body and the second end of each arm extends from the pivot mounting block toward a bottom edge of the outer circumference, along the outer circumference and across the opening.

16. The refueling mechanism of claim 15, wherein the second end of each arm includes a hooked protrusion adapted to mate with an extension positioned on an outer edge of the door when the arms are in the first position.

17. A refueling system for a vehicle, comprising:

a fuel passage coupled to a fuel tank of the vehicle; and a capless refueling mechanism including a first end coupled to the fuel passage and a second end facing an exterior of the vehicle, the mechanism including:

an outer body including an opening fluidly coupled with the fuel passage;

a rear ramped opening element;

a door rotatably coupled to the body, forward of the opening relative to the exterior of the vehicle, and including a first mating feature;

a pair of arms rotatably coupled to the body, forward of the door, and including a second mating feature adapted to mate with the first mating feature; and a latch device hingedly attached to a top portion of the door, the latch device mounted to a top internal wall of the outer body and the rear ramped opening element, the latch device abutting and sealing against the top internal wall of the outer body and the rear ramped opening element along contact interfaces.

18. The refueling system of claim 17, wherein the first mating feature includes two extensions positioned on opposite sides of an outer edge of the door and extending outward from an outer surface of the door, toward the exterior of the vehicle and wherein the second mating feature includes two hooked protrusions, one on each arm of the pair of arms, and wherein each arm includes a curved vertical front surface, a guide flange extending from a top portion of the arm, a hooked protrusion on a back surface of the arm, the back surface opposite the curved vertical front surface, and a tapered opening in a bushing.

19. The refueling system of claim 18, wherein the outer surface of the door includes an indented portion positioned between the two extensions and having a radius of curvature adapted to receive an outer surface of a fuel nozzle.

* * * * *